(12) United States Patent
Kaltenbach

(10) Patent No.: US 9,267,577 B2
(45) Date of Patent: Feb. 23, 2016

(54) TRANSMISSION FOR A MOTOR VEHICLE

(71) Applicant: ZF Friedrichshafen AG, Friedrichshafen (DE)

(72) Inventor: Johannes Kaltenbach, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 20 days.

(21) Appl. No.: 14/260,855

(22) Filed: Apr. 24, 2014

(65) Prior Publication Data

US 2014/0364269 A1    Dec. 11, 2014

(30) Foreign Application Priority Data

Jun. 5, 2013 (DE) .......................... 10 2013 210 429

(51) Int. Cl.

| F16H 3/64 | (2006.01) |
|---|---|
| F16H 3/66 | (2006.01) |
| F16H 3/00 | (2006.01) |
| F16H 3/44 | (2006.01) |

(52) U.S. Cl.
CPC ................ *F16H 3/666* (2013.01); *F16H 3/006* (2013.01); *F16H 3/64* (2013.01); *F16H 2003/442* (2013.01); *F16H 2200/006* (2013.01); *F16H 2200/0056* (2013.01); *F16H 2200/0078* (2013.01); *F16H 2200/2012* (2013.01); *F16H 2200/2015* (2013.01); *F16H 2200/2017* (2013.01); *F16H 2200/2046* (2013.01); *F16H 2200/2051* (2013.01); *F16H 2200/2056* (2013.01); *F16H 2200/2058* (2013.01); *F16H2200/2064* (2013.01); *F16H 2200/2094* (2013.01); *F16H 2200/2097* (2013.01)

(58) Field of Classification Search
CPC ..... F16H 3/62; F16H 3/666; F16H 2003/442; F16H 2003/445; F16H 2200/0056; F16H 2200/006; F16H 2200/2012; F16H 2200/2015; F16H 2200/2046; F16H 2200/2051; F16H 2200/2056; F16H 2200/2064; F16H 2200/2097
See application file for complete search history.

(56) References Cited

U.S. PATENT DOCUMENTS

| 6,764,424 | B1 | 7/2004 | Usoro et al. |
| 7,637,840 | B2 | 12/2009 | Ziemer |
| 2014/0364271 | A1* | 12/2014 | Kaltenbach .................. 475/286 |

FOREIGN PATENT DOCUMENTS

| DE | 10 2004 014 082 A1 | 10/2005 |
| DE | 10 2013 202 045 | 8/2014 |
| DE | 102013202045 A1 | 8/2014 |
| EP | 1435477 A2 | 7/2004 |
| WO | 2014121957 A1 | 8/2014 |

OTHER PUBLICATIONS

German Search Report issued in corresponding German Patent Application No. 10 2013 210 429.4 mailed May 18, 2015.

* cited by examiner

*Primary Examiner* — Jacob S Scott
(74) *Attorney, Agent, or Firm* — Davis & Bujold, P.L.L.C.; Michael J. Bujold

(57) ABSTRACT

A motor vehicle transmission having a housing, input and output shafts, shifting elements, a first planetary gearset having sun, ring and planet gears and a carrier and a second planetary gearset having planet gears and carriers that are rigidly coupled. The carriers of the first and the second gearsets are fixed, respectively, to the output and input shafts. A sun gear of the second gearset can be connected by a first shifting element to the housing and by a second shifting element to the input shaft. The ring gear of the first gearset can be connected by a third shifting element to the housing and by a fourth shifting element to the carrier of the first planetary gearset. The sun gear of the first gearset and ring gear of the second gearset are rigidly coupled, and the shifting elements are arranged in the housing and are accessible from the outside.

17 Claims, 20 Drawing Sheets

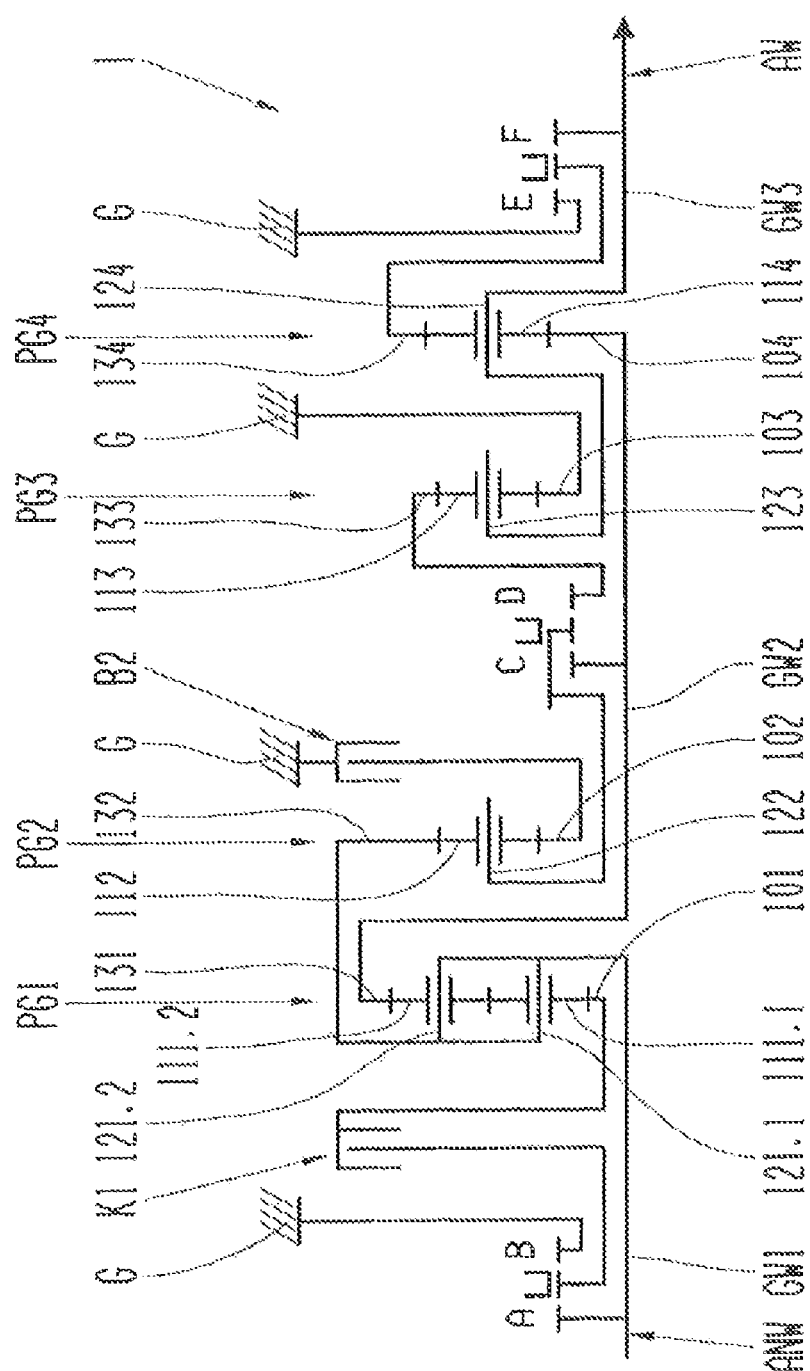

Fig. 1c

| GEAR | K1 | B2 | A | B | C | D | E | F | i | phi |
|------|----|----|---|---|---|---|---|---|------|------|
| V1 | x |   |   | x |   |   | x |   | 4.99 |      |
| V2 |   | x | x |   |   |   | x |   | 3.81 | 1.31 |
| V3 | x |   |   | x |   |   | x |   | 2.91 | 1.31 |
| V4 |   | x |   |   | x | x |   |   | 2.23 | 1.31 |
| V5 | x |   |   | x |   |   |   | x | 1.71 | 1.30 |
| V6 |   | x |   |   | x |   |   | x | 1.31 | 1.31 |
| V7 | x |   | x |   |   |   |   | x | 1.00 | 1.31 |

Fig. 1b

|     | i0    | i_PG |
|-----|-------|------|
| PG1 |  2.4  | 1.71 |
| PG2 | -3.25 | 1.31 |
| PG3 | -1.42 | 1.70 |
| PG4 | -1.91 | 2.91 |

Fig. 3c

| GEAR | K1 | B2 | A | B | C | D | E | F | L | H | R | i | phi |
|---|---|---|---|---|---|---|---|---|---|---|---|---|---|
| V1 | x |  |  |  |  |  | x |  | x |  |  | 31.62 |  |
| V2 | x | x |  | x |  |  | x |  | x |  |  | 24.12 | 1.31 |
| V3 | x |  | x |  |  |  | x |  | x |  |  | 18.44 | 1.31 |
| V4 | x | x |  |  |  | x |  |  | x |  |  | 14.12 | 1.31 |
| V5 | x |  |  | x |  |  |  | x | x |  |  | 10.86 | 1.30 |
| V6 | x | x |  |  |  |  |  | x | x |  |  | 8.29 | 1.31 |
| V7 | x |  | x |  |  |  |  | x | x |  |  | 6.34 | 1.31 |
| V8 |  | x |  |  |  |  |  |  |  | x |  | 4.99 | 1.27 |
| V9 | x |  | x |  |  |  | x |  |  | x |  | 3.81 | 1.31 |
| V10 | x | x |  | x |  |  |  |  |  | x |  | 2.91 | 1.31 |
| V11 |  | x |  |  |  | x |  |  |  | x |  | 2.23 | 1.31 |
| V12 | x |  | x |  |  |  |  | x |  | x |  | 1.71 | 1.30 |
| V13 | x | x |  |  |  |  |  | x |  | x |  | 1.31 | 1.31 |
| V14 | x |  | x |  |  |  |  | x |  | x |  | 1.00 | 1.31 |
| R1 | x |  |  | x |  |  | x |  |  |  | x | -37.61 |  |
| R2 | x | x |  |  |  |  | x |  |  |  | x | -28.69 | 1.31 |
| R3 | x |  | x |  |  |  | x |  |  |  | x | -21.94 | 1.31 |
| R4 |  | x |  |  |  | x |  |  |  |  | x | -16.80 | 1.31 |
| R5 | x |  | x |  |  |  |  | x |  |  | x | -12.93 | 1.30 |
| R6 |  | x |  | x |  |  |  | x |  |  | x | -9.86 | 1.31 |
| R7 | x |  | x |  |  |  |  | x |  |  | x | -7.54 | 1.31 |

Fig. 3b

|  | i0 | iLPG | Low | R |
|---|---|---|---|---|
| PG1 | 2.4 | 1.71 |  |  |
| PG2 | -3.25 | 1.31 |  |  |
| PG3 | -1.42 | 1.70 |  |  |
| PG4 | -1.91 | 2.91 |  |  |
| PG5 | -2.9 |  | 6.34 | -7.54 |
| PG6 | -1.60 |  |  |  |

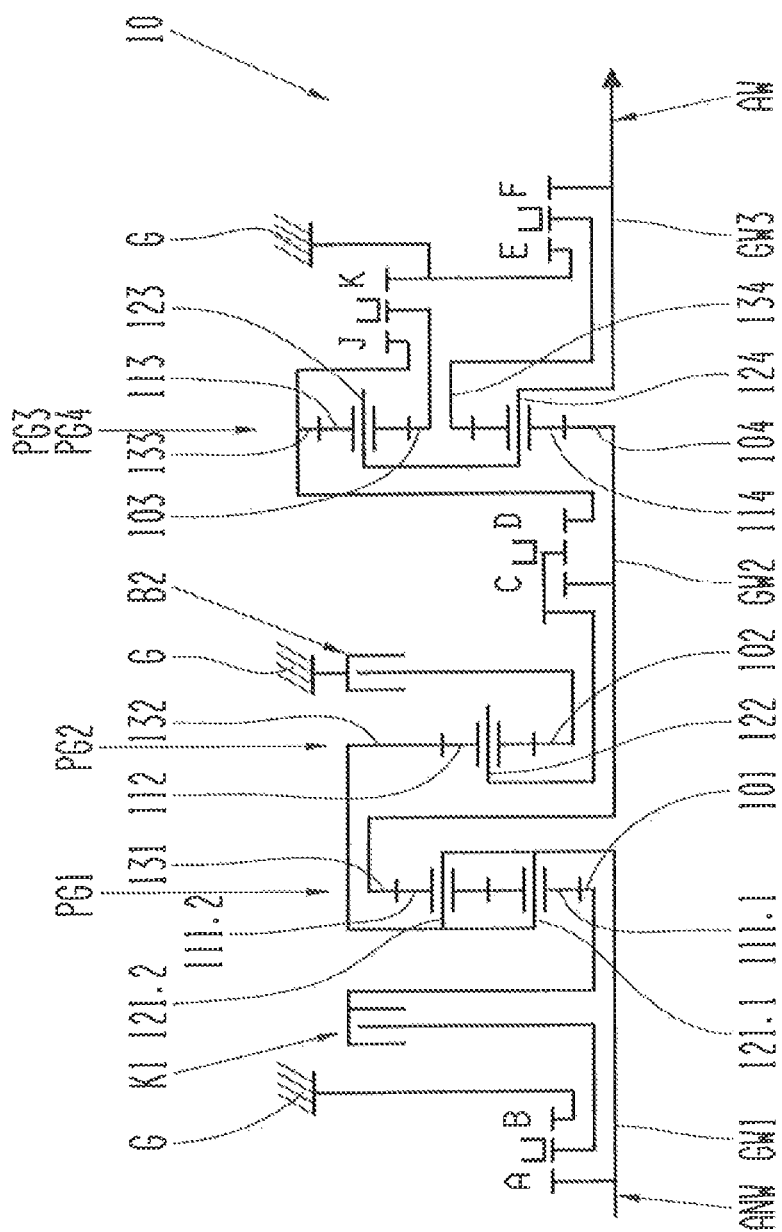

| GEAR | K1 | B2 | A | B | C | D | E | F | i | phi |
|---|---|---|---|---|---|---|---|---|---|---|
| V1 | x |   |   | x |   |   | x |   | 4.99 |   |
| V2 |   | x |   |   | x |   | x |   | 3.81 | 1.31 |
| V3 | x |   | x |   |   |   | x |   | 2.91 | 1.31 |
| V4 |   | x |   |   |   | x |   |   | 2.23 | 1.31 |
| V5 | x |   |   | x |   |   |   | x | 1.71 | 1.30 |
| V6 |   | x |   |   | x |   |   | x | 1.31 | 1.31 |
| V7 | x |   | x |   |   |   |   | x | 1.00 | 1.31 |

Fig. 4b

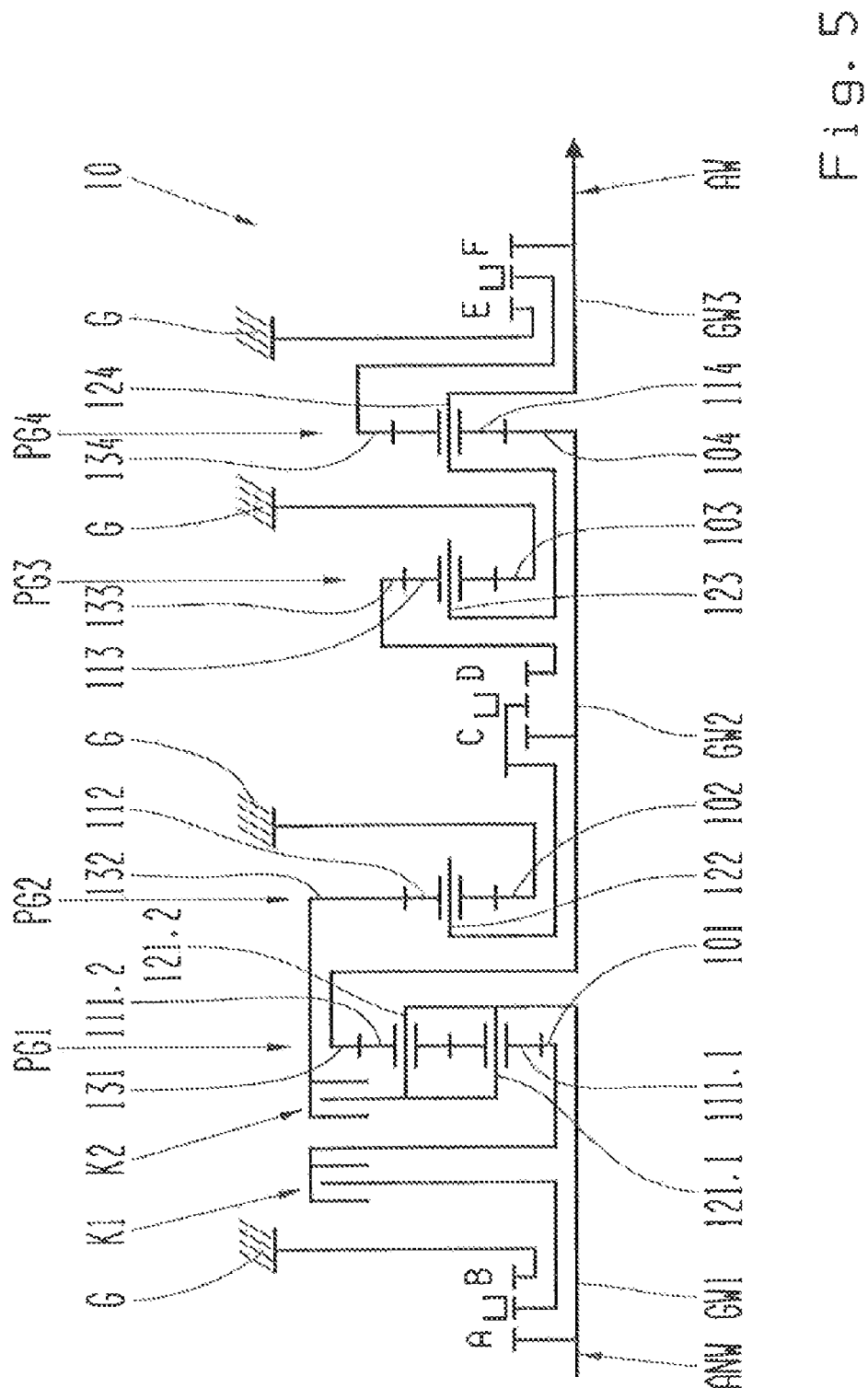

Fig. 6c

| GEAR | K1 | B2 | A | B | C | D | E | F | Y | H | i | phi |
|---|---|---|---|---|---|---|---|---|---|---|---|---|
| V1 |  | x |  |  |  |  |  |  | x |  | 6.5 |  |
| V2 | x |  |  |  | x |  | x |  |  |  | 4.99 | 1.30 |
| V3 |  | x |  | x |  |  | x |  |  |  | 3.81 | 1.31 |
| V4 | x |  | x |  | x |  | x |  |  |  | 2.91 | 1.31 |
| V5 |  | x |  |  |  | x | x |  |  |  | 2.23 | 1.31 |
| V6 | x |  |  | x |  |  |  |  | x |  | 1.71 | 1.30 |
| V7 |  | x |  |  | x |  |  | x |  | x | -1.31 | 1.31 |
| V8 | x |  | x |  |  |  |  | x |  |  | 1.00 | 1.31 |

Fig. 6b

|  | i0 | i_PG |
|---|---|---|
| PG1 | 2.4 | 1.71 |
| PG2 | -3.25 | 1.31 |
| PG3 | -1.42 | 1.70 |
| PG4 | -1.91 | 2.91 |

| GEAR | K1 | B2 | A | B | C | D | E | F | Y | H | i | phi |
|---|---|---|---|---|---|---|---|---|---|---|---|---|
| V1 |  | x |  |  |  |  |  |  | x |  | 6.5 |  |
| V2 | x |  |  | x |  |  | x |  |  |  | 4.99 | 1.30 |
| V3 |  | x |  |  | x |  | x |  |  |  | 3.81 | 1.31 |
| V4 | x |  | x |  |  |  | x |  |  |  | 2.91 | 1.31 |
| V5 |  | x |  |  |  | x |  |  |  | x | 2.23 | 1.31 |
| V6 | x |  |  | x |  | x |  |  |  |  | 1.71 | 1.30 |
| V7 |  | x |  |  |  |  |  | x |  |  | 1.31 | 1.31 |
| V8 | x |  | x |  |  |  |  | x |  |  | 1.00 | 1.31 |

Fig. 7c

| | i0 | i_PG |
|---|---|---|
| PG1 | 2.4 | 1.71 |
| PG2 | -3.25 | 1.31 |
| PG3 | -1.42 | 1.70 |
| PG4 | -1.91 | 2.91 |

Fig. 7b

| GEAR | A | B | C | D | E | F | i | phi |
|------|---|---|---|---|---|---|------|------|
| V1 | x | x |   |   | x |   | 4.99 |      |
| V2 |   |   | x |   | x |   | 3.81 | 1.31 |
| V3 | x |   |   |   | x |   | 2.91 | 1.31 |
| V4 |   |   |   | x |   |   | 2.23 | 1.31 |
| V5 |   | x |   |   |   | x | 1.71 | 1.30 |
| V6 |   |   | x |   |   | x | 1.31 | 1.31 |
| V7 | x |   |   |   |   | x | 1.00 | 1.31 |

Fig. 8c

|     | i0    | i_PG |
|-----|-------|------|
| PG1 | 2.4   | 1.71 |
| PG2 | -3.25 | 1.31 |
| PG3 | -1.42 | 1.70 |
| PG4 | -1.91 | 2.91 |

| GEAR | X | A | B | C | D | E | F | i | phi |
|---|---|---|---|---|---|---|---|---|---|
| V1 | x | x |   |   |   |   |   | 4.99 |   |
| V2 |   | x | x |   |   | x |   | 3.81 | 1.31 |
| V3 | x |   |   | x |   | x |   | 2.91 | 1.31 |
| V4 | x |   | x |   | x |   |   | 2.23 | 1.31 |
| V5 | x | x |   | x |   |   |   | 1.71 | 1.30 |
| V6 |   | x | x |   |   |   | x | 1.31 | 1.31 |
| V7 |   |   |   |   |   | x | x | 1.00 | 1.31 |

Fig. 9b

|  | i0 | i_PG |
|---|---|---|
| PG1 | 2.4 | 1.71 |
| PG2 | -3.25 | 1.31 |
| PG3 | -1.42 | 1.70 |
| PG4 | -1.91 | 2.91 |

| GEAR | K1 | B2 | A | B | C | D | E | F | i | phi |
|---|---|---|---|---|---|---|---|---|---|---|
| V1 | x | | x | x | | | | | 4.99 | |
| V2 | x | x | | | x | | | | 3.81 | 1.31 |
| V3 | x | | x | | | | x | | 2.91 | 1.31 |
| V4 | x | x | | | | x | | | 2.22 | 1.31 |
| V5 | x | | | x | x | | | | 1.71 | 1.30 |
| V6 | x | x | | | | | x | | 1.31 | 1.31 |
| V7 | x | | x | | | | | x | 1.00 | 1.31 |

Fig. 12c

| | i0 | i_PG bzw. i_VG |
|---|---|---|
| PG1 | 2.4 | 1.71 |
| PG2 | -3.25 | 1.31 |
| PG3 | | 1.70 |
| PG4 | -1.91 | 2.91 |

Fig. 12b

TRANSMISSION FOR A MOTOR VEHICLE

This application claims priority from German patent application serial no. 10 2013 210 429.4 filed Jun. 5, 2013.

FIELD OF THE INVENTION

The present invention concerns a transmission, in particular a multiple-gear transmission for a motor vehicle, comprising a housing, a drive input shaft, a drive output shaft, at least two planetary gearsets, wherein the first planetary gearset comprises a sun gear, at least one planetary gearwheel, a planetary carrier and a ring gear, as well as a plurality of shifting elements.

BACKGROUND OF THE INVENTION

From DE 10 2013 202 045 a range-change transmission of a motor vehicle has become known. The range-change transmission comprises a multiple-gear main transmission and a range group in drive connection downstream from the main transmission. In this case the range group is of planetary design and comprises two mutually coupled planetary gearsets each with a sun gear, a planetary carrier carrying a plurality of planetary gearwheels, and a ring gear. The two planetary gearsets of the range group are arranged coaxially and axially offset relative to one another, with the first planetary gearset positioned between the main transmission and the second planetary gearset. The sun gear of the first planetary gearset is connected in a rotationally fixed manner to the main shaft of the main transmission and so forms the input element of the range group. The planetary carrier of the first planetary gearset is connected rotationally fixed to the ring gear of the second planetary gearset. The ring gear of the first planetary gearset is connected rotationally fixed to the sun gear of the second planetary gearset. The planetary carrier of the second planetary gearset is connected rotationally fixed to the drive output shaft and thus forms the output element of the range group.

Furthermore, DE 10 2004 014 082 A1 discloses a dual clutch transmission of planetary design. The dual clutch transmission comprises four planetary gearsets, two friction shifting elements and a plurality of interlocking shifting elements. The friction shifting elements are designed for the engagement of various power paths in a force flow of the planetary transmission. The interlocking shifting elements, in turn, are designed for the engagement of various gear ratios in the power paths of the planetary transmission. In addition, the friction shifting elements and interlocking shifting elements are arranged between the shafts of the planetary gearsets, a housing of the planetary transmission or a component fixed to the housing, and a transmission input shaft and a transmission output shaft, in such manner that gearshifts can be carried out by means of the friction shifting elements without traction force interruption.

A disadvantage of this, among others, is that since the shifting elements are internal ones, through-going means of access are necessary for their actuation. Moreover, the two-step transmission described gives only six gears.

SUMMARY OF THE INVENTION

An objective of the present invention is therefore to provide a transmission for a motor vehicle, which enables good accessibility of the shifting elements, with a large number of gears and a compact structure. In addition, an objective of the present invention is to indicate an alternative transmission.

The present invention achieves these objectives with a transmission, in particular a multiple-gear transmission for a motor vehicle, which comprises a housing, a drive input shaft, a drive output shaft, at least two planetary gearsets wherein the first planetary gearset comprises a sun gear, at least one planetary gearwheel, a planetary carrier and a ring gear, and a plurality of shifting elements, in that the second planetary gearset comprises at least two planetary gearwheels and two planetary carriers connected rotationally fixed to one another, on which the respective planetary gearwheel is mounted to rotate, and the carriers of the second planetary gearset are connected rotationally fixed to the drive output shaft, and the carrier of the first planetary gearset is connected to the drive output shaft, and the sun gear of the second planetary gearset can be connected to the housing by means of at least one first shifting element and to the drive input shaft by means of a second shifting element, and the ring gear of the first planetary gearset can be connected by means of a third shifting element to the housing and by means of a fourth shifting element to the carrier of the first planetary gearset, and the sun gear of the first planetary gearset and the ring gear of the second planetary, gearset are connected rotationally fixed to one another, and wherein most, and in particular all of the shifting elements are arranged in the housing in such manner that they can be accessed from outside.

The invention also achieves the objectives with a motor vehicle, in particular a passenger or commercial vehicle, having a transmission as described below.

This has the advantage, among others, that most of the shifting elements are easily accessible and, for example, can be accessed by shifting forks from outside in a simple manner. Thus, no through-going access is needed for actuating the shifting elements concerned. Further advantages are a compact structure, small inertial masses and a power density due to the division among a plurality of planetary gearwheels. Moreover, with the transmission a sufficiently large number of gears can be obtained.

By way of the drive input shaft, particularly preferably a torque or rotation movement of a driveshaft, for example that of an internal combustion engine, is introduced into the transmission.

In what follows, the term shaft should not be understood to mean exclusively a—for example—cylindrical machine element mounted to rotate in order to transmit torques, but rather, the term is understood also to refer in general to connecting elements that connect individual components or elements to one another, in particular connecting elements that connect a plurality of elements to one another in a rotationally fixed manner.

In particular, two elements are said to be connected to one another when there is a firm, in particular rotationally fixed connection between the elements. In particular, elements so connected rotate at the same rotational speed.

Furthermore, two elements are said to be connectable when there is a releasable connection between those elements. In particular, the elements rotate at the same rotational speed when the connection has been formed.

In the present context the various components and elements of the invention can be connected to one another by way of a shaft or a connecting element, but also directly, for example by means of a weld joint, press fit or some other means of connection.

In the description and especially in the claims, a clutch should preferably be understood to mean a shifting element which, depending on its actuation condition, allows relative movement between two components or produces a fixed connection for the transmission of a torque. A relative movement is understood to mean, for example, a rotation of two components such that the rotational speeds of the first and of the second components are different. Moreover, it is also conceivable that only one of he two components rotates whereas the other component is stationary, or is rotating in the opposite direction.

In what follows, a non-actuated clutch is understood to be an open clutch. This means that the two components can move relative to one another. Correspondingly, when the clutch is closed the two components rotate at the same rotational speed in the same direction.

Preferably in the description and especially in the claims, a brake should be understood to mean a shifting element which is connected on one side to a fixed element such as a housing, and on another side to an element that can rotate.

In what follows, a non-actuated brake is understood to be an open brake. This means that the rotating component can rotate freely, i.e. the brake preferably has no effect on the rotational speed of the rotating component. When the brake is actuated or closed, the rotational speed of the rotating component is reduced until the rotation stops, i.e. a firm connection can be formed between the rotating element and the fixed element. In this connection the terms 'element' and 'component' are equivalent. Basically, shifting elements can also be used in a manner such that they are closed when not actuated and open when actuated. Correspondingly, the association between their function and their shift condition is then understood to be the converse of the shift conditions described above. The example embodiments described below with reference to the figures are primarily based on an arrangement in which an actuated shifting element is closed and a non-actuated shifting element is open.

A planetary gearset comprises a sun gear, a planetary carrier or carrier, and a ring gear. Mounted to rotate on the planetary carrier or carrier are planetary gearwheels or planetaries, which mesh with the teeth of the sun gear and/or with the teeth of the ring gear.

Below, a 'minus' planetary gearset is a planetary gearset with a planetary carrier on which the planetary gearwheels are mounted to rotate, with a sun gear and with a ring gear, wherein the teeth of at least one of the planetary gearwheels mesh both with the teeth of the sun gear and also with those of the ring gear, so that the ring gear and the sun gear rotate in opposite directions when the planetary carrier is fixed and the sun gear is rotating.

A 'plus' planetary gearset differs from the 'minus' planetary gearset just described, in that the plus planetary gearset has inner and outer planetary gearwheels which are mounted to rotate on the planetary carrier. The teeth of the inner planetary gearwheels mesh on one side with the teeth of the sun gear and on the other side with those of the outer planetary gearwheels. In addition the teeth of the outer planetary gearwheels mesh with those of the ring gear. As a result, when the planetary carrier is fixed the ring gear and the sun gear rotate in the same direction.

The use of planetary gearsets enables particularly compact transmissions to be made, and this in turn allows great freedom in the arrangement of the transmission in the vehicle.

The elements of a planetary gearset are in particular understood to be the sun gear, the ring gear, the planetary carrier or carrier and the planetary gearwheels or planetaries of the planetary gearset.

Particularly preferably the shifting elements can be actuated selectively, ie. according to need, whereby various gears that give different gear ratios between the drive input shaft and the drive output shaft can be obtained. The larger is the number of gears, the finer can a gear gradation over a large transmission spread be achieved, so that for example an internal combustion engine of a motor vehicle can be operated in an optimum rotational speed range and therefore as economically as possible. At the same time this contributes toward increasing the driving comfort since the internal combustion engine can preferably be operated at a low rotational speed level. Accordingly for example, the noise emitted by operating the internal combustion engine is reduced.

Furthermore, the shifting elements can be designed such that energy is needed for changing the shift condition of a shifting element, but not for maintaining the shift condition itself.

For that purpose, shifting elements are particularly suitable which can be actuated according to need, such as electromechanical or electromagnetic shifting elements. Particularly by comparison with conventional, hydraulically actuated shifting elements, these are noted for particularly low and efficient energy demand, since they can be operated almost free from losses. Moreover, in an advantageous manner there is no need to maintain permanently a control pressure for actuating the—for example—conventional hydraulic shifting elements or for acting permanently upon the shifting element concerned with the hydraulic pressure required in order to keep it in its engaged condition. Accordingly, for example, further components such as a hydraulic pump can be omitted, provided that such components serve exclusively for the control and supply of the conventional, hydraulically actuated shifting elements. If other components are supplied with lubricant not by way of a separate lubricant pump but by the same hydraulic pump, then the latter can at least be made smaller. Besides, any leaks at oil transfer points of the hydraulic circuit, in particular at rotating components, are eliminated. Particularly preferably, this also contributes to increasing the efficacy of the transmission by boosting its efficiency.

When shifting elements of the above-mentioned type that can be actuated as necessary are used, it is particularly advantageous if these can be accessed easily from outside. Among other things this has the advantage that the shifting energy required can be easily supplied to the shifting elements. Accordingly, it is particularly preferred to arrange the shifting elements so as to be easily accessible from outside. In the context of shifting elements, 'easily accessible from outside' means that no other components are arranged on intermediate housings of the transmission and the shifting element, and particularly preferably, that the shifting elements are arranged on the drive input shaft or on the drive output shaft.

The term "connectability" is preferably understood in the description and particularly in the claims, to mean that in different geometrical positions the same connection or joining of interfaces is ensured, without intersection of individual connecting elements or shafts.

The term "fixed gear ratio" is understood to mean the gear ratio which is produced by virtue of the gear ratio between the sun gear and the ring gear of the planetary gearset concerned, when the planetary carrier or carrier is stationary.

Expediently, the transmission comprises at least one further, third, fourth, fifth and/or sixth planetary gearset, such that at least two of the further planetary gearsets are arranged, in particular geometrically, one behind another in the transmission and/or at least two of the further planetary gearsets are nested, in particular with the first planetary gearset inside the fourth planetary gearset and/or the fifth planetary gearset inside the sixth planetary gearset. One of the advantages achieved by this nested configuration is that the transmission can be made axially even more compact.

Advantageously, a third planetary gearset is arranged between the second and fourth planetary gearsets, between the first and second planetary gearsets or between the second and fifth planetary gearsets, such that the sun gear of the third planetary gearset is connected fixed to the housing or can be connected to the housing by means of a fifth shifting element. If a third planetary gearset is arranged between the two planetary gearsets, the number of possible gears that can be obtained with the transmission is farther increased.

Expediently, the carrier of the third planetary gearset is connected rotationally fixed to the ring gear of the fourth planetary gearset, or the carrier of the third planetary gearset can be connected by means of a sixth shifting element to the sun gear of the first planetary gearset or, by means of a seventh shifting element, to the ring gear of the fourth planetary gearset. Thanks to the shifting elements for coupling the carrier of the third planetary gearset, the number of possible gears that can be obtained by the transmission can again be increased.

Advantageously, the carriers of the second planetary gearset are connected in a rotationally fixed manner to the ring gear of the third planetary gearset or the carriers of the second planetary gearset can be connected by means of an eighth shifting element to the ring gear of the third planetary gearset. An advantage that can be achieved by a fixed connection of the carriers of one planetary gearset to the ring gear of another planetary is that the structure of the transmission is made substantially more simple.

Expediently, an electric machine is provided, in particular to produce reversing gears with the transmission. By virtue of the electric machine, on the one hand the traction force can be assisted electrically and on the other hand it can also be used to obtain reversing gears, since when a forward gear is produced the electric machine causes the drive output shaft, ultimately, to rotate in a reverse direction.

Advantageously, the sun gear of the fourth planetary gearset is connected to the housing or can be connected thereto by means of a ninth shifting element. In this way the central element of the fourth planetary gearset, namely its sun gear, can be connected in a fixed manner to the housing if necessary, or the structure of the transmission is simplified if the sun gear is arranged fixed on the housing.

Expediently, the sun gear of the fourth planetary gearset can be connected to the ring gear of the fourth planetary gearset by means of a shifting element. If a sun gear of a planetary gearset can be connected by a shifting element to the ring gear of the planetary gearset, this increases farther the number of possible gears that can be obtained by the transmission.

Advantageously, the ring gear of the first planetary gearset is connected in a rotationally fixed manner to the sun gear of the first planetary gearset, and can be connected by the third shifting element to the housing and/or by the fourth shifting element to the drive output shaft. If shifting elements are provided for coupling the ring gear of the planetary gearset, this also increases farther the number of possible gears that can be obtained with the transmission. Moreover, in a flexible manner the ring gear of the first planetary gearset can be connected to various other transmission elements.

Expediently, the fifth planetary gearset and the sixth planetary gearset are arranged in a nested configuration and form a reversing gear group, this reversing gear group being arranged at the output of the transmission, wherein the sun gear of the fifth planetary gearset is connected rotationally fixed to the carrier of the first planetary gearset and the carrier of the fifth planetary gearset can be connected to the housing by means of an eleventh shifting element in order to produce at least one reversing gear, and wherein the sun gear of the sixth planetary gearset can be connected to the housing by a twelfth shifting element and can be connected to the carrier of the fifth planetary gearset by means of a thirteenth shifting element. The reversing gear group so formed can be integrated into an existing transmission in a simple manner. Moreover, the nested arrangement of the fifth and sixth planetary gearsets enables the transmission to be made axially even more compact, which reduces the overall space needed for the transmission.

Advantageously, the fifth planetary gearset is arranged at the input of the transmission and the sun gear of the fifth planetary gearset is made rotationally fixed to the drive input shaft, while the carrier of the fifth planetary gearset can be connected to the housing by an eleventh shifting element in order to obtain at least one reversing gear, or can be connected to the drive input shaft by a further shifting element to obtain at least one forward gear. By providing the fifth planetary gearset at the input of the transmission, in a simple manner an upstream intermediate group is obtained. In this case the at least one reversing gear can be arranged as a reversing gearset at the transmission input.

Expediently, the first and second planetary gearsets form a first partial transmission and the first planetary gearset, together with the third and fourth planetary gearsets, form a second partial transmission. In that case the first planetary gearset constitutes a range group used in common by both of the partial transmissions, so that by virtue of this shared utilization of the first planetary gearset in both partial transmissions the fitting space for the transmission can again be reduced.

Advantageously an intermediate gear system is provided, the intermediate gear system comprising at least one countershaft and at least two gearwheel planes, such that the first wheel plane can be connected by means of a shifting element to the carrier of the third planetary gearset and the second wheel plane is in driving connection with the carrier of the first planetary gearset. By virtue of the two gearwheel planes of the intermediate gear system a double gear interval can be covered in a simple manner.

Expediently, a separator clutch is arranged as a starting clutch, which in particular connects a drive engine to the driveshaft at the input of the transmission. For example during traction force assistance by an electric machine, the separator clutch can be used as a starting clutch if the energy accumulator of the electric machine is run down or if the electric machine has insufficient power.

Advantageously, by means of at least nine shifting elements and at least two powershift elements, as well as six planetary gearsets, at least 14 forward gears and at least seven reversing gears can be obtained.

Further important characteristics and advantages of the present invention emerge from the subordinate claims, from the drawings, and from the associated figure descriptions that relate to the drawings.

It is understood that the features mentioned above and those still to be explained below, can be used not only in the combination indicated in each case but also in other combinations or in isolation, without going beyond the scope of the present invention.

BRIEF DESCRIPTION OF THE DRAWINGS

Preferred designs and embodiments of the invention are illustrated in the drawings and will be explained in more detail in the description given below, wherein the same indexes refer to the same, or similar, or functionally equivalent components or elements.

The drawings show, in each case schematically:

FIG. 1a: A transmission according to a first embodiment of the present invention;

FIG. 1b: A gear ratio scheme for a transmission as in FIG. 1a;

FIG. 1c: A shifting matrix for a transmission as in FIG. 1a;

FIG. 3b: A gear ratio scheme for a transmission as in FIG. 3a;

FIG. 3c: A shifting matrix for a transmission as in FIG. 3a;

FIG. 4a: A transmission according to a fourth embodiment of the present invention;

FIG. 4b: A shifting matrix for a transmission as in FIG. 4a;

FIG. 5: A transmission according to yet a fifth embodiment of the present invention;

FIG. 6b: A gear ratio scheme for a transmission as in FIG. 6a;

FIG. 6c: A shifting matrix for a transmission as in FIG. 6a;

FIG. 7b: A gear ratio scheme for a transmission as in FIG. 7a;

FIG. 7c: A shifting matrix for a transmission as in FIG. 7a;

FIG. 8b: A gear ratio scheme for a transmission as in FIG. 8a;

FIG. 8c: A shifting matrix for a transmission as in FIG. 8a;

FIG. 9b: A gear ratio scheme for a transmission as in FIG. 9a;

FIG. 9c: A shifting matrix for a transmission as in FIG. 9a;

FIG. 12b: A gear ratio scheme for a transmission as in FIG. 12a; and

FIG. 12c: A shifting matrix for a transmission as in FIG. 12a;

DETAILED DESCRIPTION OF THE PREFERRED EMBODIMENTS

Figure 2:
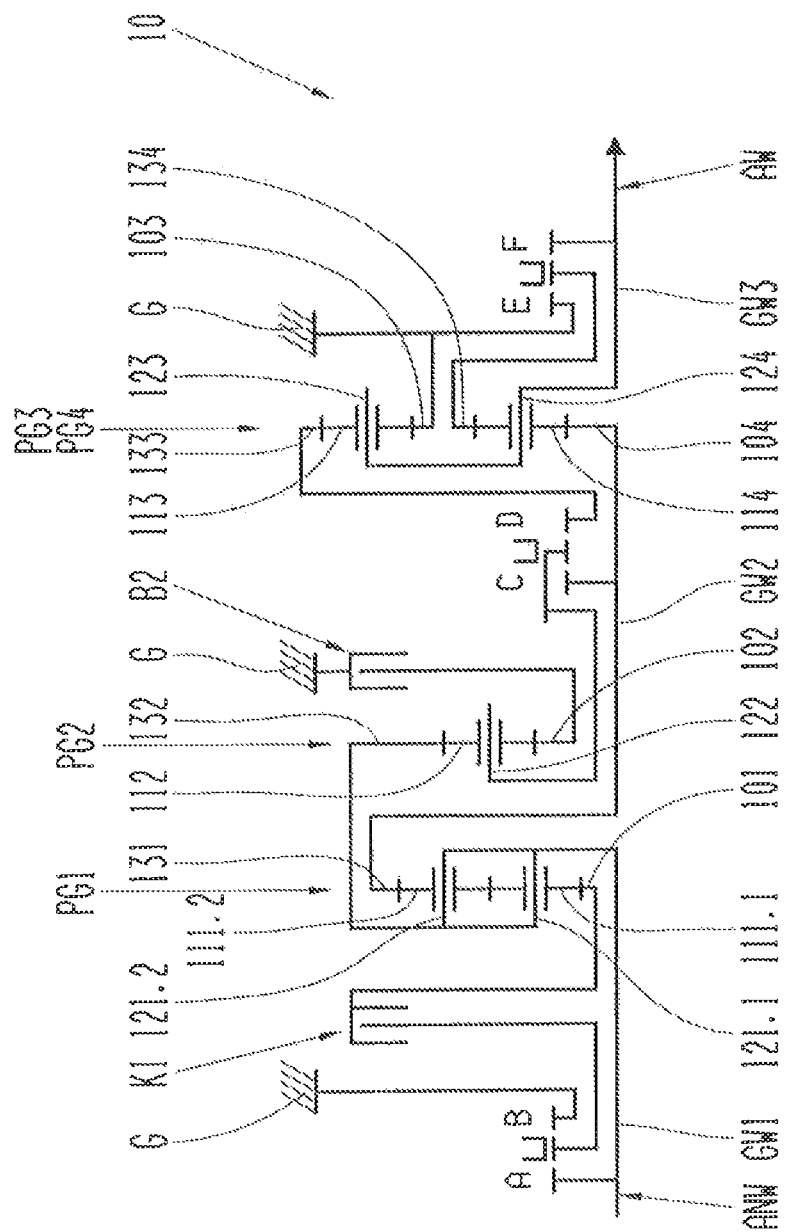
FIG. 2: A transmission according to a second embodiment of the present invention.

In FIG. 1a the index 1 denotes a multiple-gear transmission of planetary design. The multiple-gear transmission 1 shown in FIG. 1a can for example be in the form of a dual clutch transmission with seven gears comprising two direct-drive (DD) gears. The term "direct drive" means in particular that the highest gear corresponds to a direct gear. Furthermore, in FIGS. 1a and 1n the other FIGS. 2 to 12a, in each case only one half of the rotationally symmetrical transmission is shown.

The transmission 1 has a total of eight shifting elements A, B, C, D, E, F, K1 and B2, of which one is in the form of a clutch K1 and one is in the form of a brake B2, and four planetary gearsets PG1, PG2, PG3 and PG4. The six shifting elements form, for example, three dual shifting elements A/B, C/D and E/F. Preferably most, or particularly preferably all the shifting elements in the transmission 1 are arranged in a housing G of the transmission 1 and are accessible from the outside, so that they can be actuated from outside for example by means of shifting forks or the like. This applies to all the embodiments of the invention and in particular the example embodiments described in FIGS. 1 to 12. Furthermore, the transmission 1 has a plurality of transmission shafts for example GW1, GW2 and GW3, such that the first transmission shaft GW1 is the drive input shaft ANW and the third transmission shaft is the drive output shaft AW.

Below, the general structure of the first planetary gearset PG1, the second planetary gearset PG2, the third planetary gearset PG3 and the fourth planetary gearset PG4 of the transmission 1 will first be described. The planetary gearsets PG1, PG2, PG3 and PG4 comprise in each case a respective sun gear 101, 102, 103, 104 which co-operates with at least one planetary gearwheel 111.1, 111.2, 112, 113, 114 for the transmission of force and torque. In this case the first planetary gearset PG1 has two planetary gearwheels 111.1 and 111.2, of which the planetary gearwheel 111.1 meshes with the sun gear 101. Radially outside the respective planetary gearwheels 111.2, 112, 113, 114 of the first, second, third and fourth planetary gearsets PG1, PG2, PG3, PG4 is arranged in each case a ring gear 131, 132, 133, 134 which meshes with the respective planetary gearwheel 111.2, 112, 113, 114 for the transmission of force and torque. The planetary gearwheels 111.1, 111.2, 112, 113, 114 are in each case mounted to rotate on a corresponding planetary carrier 121.1, 121.2, 122, 123, 124.

In the first planetary gearset PG1, the sun gear 101 is connected to the clutch K1. In addition a first dual shifting element NB is provided, which combines the two shifting elements A and B. When the first shifting element A is closed or actuated, the drive input shaft ANW is connected to the clutch K1 and when, in addition, the clutch K1 is also actuated, then correspondingly the drive input shaft ANW is connected to the sun gear 101. When the second shifting element B is closed or actuated, the clutch K1 is connected to the housing G and when, in addition, the clutch K1 is also actuated, then correspondingly the sun gear 101 is connected to the housing G so that the sun gear 101 is fixed relative to the housing. The ring gear 131 of the first planetary gearset PG1 is connected in a rotationally fixed manner to the sun gear 104 of the fourth planetary gearset PG4. In this case the ring gear 131 and the sun gear 104 are each connected rotationally fixed to the second transmission shaft GW2. Furthermore, the first planetary gearwheel 111.1 of the first planetary gearset PG1 is mounted to rotate on the first carrier/planetary carrier 121.1. The second planetary gearwheel 111.2 is mounted to rotate on the second carrier/planetary carrier 121.2. The first carrier 121.1 and the second carrier 121.2 of the first planetary gearset PG1 are connected in a rotationally fixed manner, on the one hand to the drive input shaft ANW and the first transmission shaft GW1 and on the other hand to the ring gear 132 of the second planetary gearset PG2.

The planetary gearwheel 112 of the second planetary gearset PG2 is mounted to rotate on the carrier 122 of the second planetary gearset PG2. The sun gear 102 of the second planetary gearset PG2 can be connected rotationally fixed to the housing G by the brake B2. The carrier 122 of the second planetary gearset PG2 can be coupled by means of the second dual shifting element C/D to other transmission elements. The second dual shifting element C/D combines the two shifting elements C and D. By means of the third shifting element C, the carrier 122 of the second planetary gearset PG2 can be connected to the second transmission shaft GW2 and the sun gear 104 of the fourth planetary gearset PG4. Furthermore, by means of the fourth shifting element D the carrier 122 of the second planetary gearset can in turn be connected to the ring gear 133 of the third planetary gearset PG3.

The sun gear 103 of the third planetary gearset PG3 is connected and so fixed relative to the housing G. The planetary gearwheel 113 of the third planetary gearset PG3 is mounted to rotate on the carrier 123 of the third planetary gearset PG3 and is connected rotationally fixed to the carrier 124 of the fourth planetary gearset PG4. As described earlier, the ring gear 133 of the third planetary gearset PG3 can be connected by means of the fourth shifting element D to the carrier 122 of the second planetary gearset PG2.

The sun gear 104 of the fourth planetary gearset PG4 is connected in a rotationally fixed manner to the ring gear 131 of the first planetary gearset PG1. In the example embodiment shown in FIG. 1a the sun gear 104 of the fourth planetary gearset PG4 and the ring gear 131 of the first planetary gearset PG1 are in addition connected rotationally fixed to the second transmission shaft GW2. The planetary gearwheel 114 of the fourth planetary gearset PG4 is mounted to rotate on the carrier 124 of the fourth planetary gearset PG4, and the carrier 124 is connected rotationally fixed to the drive output shaft AW or third transmission shaft GW3. The ring gear 134 of the fourth planetary gearset PG4 can be connected by means of the fifth shifting element E of the dual shifting element E/F to the housing G. On the other hand, if the sixth shifting element F is actuated or closed, then the ring gear 134 of the fourth planetary gearset PG4 is connected to the drive output shaft AW or third transmission shaft GW3.

The transmission 1 as shown in FIG. 1a comprises a first and a second partial transmission TG1 and TG2, each with a frictional shifting element, i.e. the clutch K1 or the brake B2, for powershifts. In this case the frictional shifting elements K1 and B2 are distributed shifting elements, so the transmission 1 in FIG. 1a does not have a typical dual clutch since there is no common driveshaft for the clutch K1 and the brake B2.

The first partial transmission TG1 comprises the first and fourth planetary gearsets PG1 and PG4, and the second partial transmission TG2 comprises the second, third and fourth planetary gearsets PG2, PG3 and PG4.

The first partial transmission TG1 has 2×2=4 gear ratios, and the first dual shifting element NB engages the two gear ratios. Geometrically, the gear interval k amounts for example to 1.31. The second shifting element B engages a so-termed underdrive ratio $k^2$, which can be provided by means of the first planetary gearset PG1. The drive input takes place from the drive input shaft ANW and the carriers 111.1 and 111.2 of the first planetary gearset PG1 connected rotationally fixed to it. In turn, the drive output takes place by way of the ring gear 131 of the first planetary gearset PG1 and the sun gear 104 of the fourth planetary gearset PG4 connected rotationally fixed to it. The sun gear 103 of the third planetary gearset PG3 is fixed to the housing, as described earlier. This therefore is a plus-transmission. Furthermore, by means of the first shifting element A, a direct-drive ratio i=1 can be engaged. During this the first planetary gearset PG1 rotates as a block. These two gear ratios are doubled by the fourth planetary gearset PG4. Thus, four gears can be obtained. In this case the fourth planetary gearset PG4 constitutes a range group used in common by both of the partial transmissions TG1 and TG2. The drive input shaft ANW extends through the first partial transmission TG1 to the second partial transmission TG2.

As described above, the second partial transmission comprises the second, third and fourth planetary gearsets PG2, PG3 and PG4 and there are therefore 1×2+1=3 gear ratios. For the second partial transmission TG2 the third shifting element C engages an underdrive gear ratio $k^1$. In this case the drive input takes place by way of the ring gear 132 of the second planetary gearset PG2, which is connected rotationally fixed to the two carriers 121.1 and 121.2 of the first planetary gearset PG1 and the drive input shaft ANW. In turn, the drive output takes place by way of the carrier 122 of the second planetary gearset PG2, wherein the sun gear 102 of the second planetary gearset PG2 can be connected to the housing G by means of the brake B2. This is used in duplicate by the fourth planetary gearset PG4, i.e. there are 1×2=2 gear ratios. The fourth shifting element D engages a gear with gear ratio $k^3$ independently of the range group formed by the fourth planetary gearset PG4. This gear is produced by the second and third planetary gearsets PG2 and PG3 together. For that, the second planetary gearset PG2 produces a gear ratio $k^1$ and the third planetary gearset PG3 a gear ratio $k^2$. Connected in series, this gives the ratio $k^3$. That gear is then used in duplicate by the fourth planetary gearset PG4. In that way, with the fifth and sixth shifting elements E and F the fourth planetary gearset PG4 can be shifted while free from load as a background shift.

FIG. 1b shows a gear ratio scheme for a transmission as in FIG. 1a.

As an example, FIG. 1b shows a transmission ratio table for gears of the four planetary gearsets PG1 to PG4 of the transmission according to FIG. 1a. In this, a respective fixed transmission ratio i0 and respective planetary gearset transmission ratios i_PG are indicated for the planetary gearsets PG1 to PG4.

FIG. 1c shows a shifting matrix for a transmission as in FIG. 1a.

FIG. 1c shows an example shifting matrix for the transmission according to FIG. 1a. In the shifting matrix shown in FIG. 1c crosses are only entered for those of the shifting elements, i.e. the shifting elements A to F, the clutch K1 and the brake B2, which are needed for the forward gears V1 to V7 in each case and which are actuated or closed in the gear concerned. However, other shifting elements too can be actuated or closed in order to preselect a gear in the other partial transmission or in order to produce defined rotational speeds at all the shafts, etc. These additionally actuated or closed shifting elements are then free from load. The next to last column of the shifting matrix shows examples of the gear ratios i of the engaged forward gears V1 to V7. The last column of the shifting matrix, in turn, indicates the resulting transmission ratio phi of the gear next-lower than the forward gear V1 to V7 concerned.

An advantage of the transmission as shown in FIG. 1a is that all the shifting elements are accessible from the outside. Thus, no through-going access is needed for shifting forks.

Such a powershift transmission would be incomplete without a reversing gear or R-gear for short. Thus, the transmission shown in FIG. 1a and the corresponding FIGS. 1b and 1c serves as a basis for various variants of reversing or R-gears, as is made clear in the following FIGS. 2a to 12a.

The synchronization of the shifting elements A to F can for example take place conventionally in the form of individually synchronized shifting elements or by means of a central synchronizing system for the two partial transmissions TG1 and TG2, for example by means of a transmission brake and/or by one or more electric machines or E-machines.

FIG. 2 shows a second embodiment of a transmission according to the present invention.

FIG. 2 shows another embodiment of the multiple-gear transmission according to FIG. 1a. The structure of the multiple-gear transmission 10 in FIG. 2 corresponds essentially to the transmission 1 in FIG. 1a, so in order to avoid unnecessary repetitions reference should be made to the description relating to FIGS. 1a to 1c.

The transmission 10 in FIG. 2 differs from the transmission 1 in FIG. 1a in that the third and fourth planetary gearsets PG3 and PG4 are in a nested arrangement, with the fourth planetary gearset PG4 arranged radially and coaxially within the third planetary gearset PG3. The sun gear 103 of the third planetary gearset PG3 is connected fixed to the housing G. Furthermore, the ring gear B3 of the third planetary gearset PG3 can be connected by means of the fourth shifting element D to the carrier 122 of the second planetary gearset PG2. In addition, the ring gear 133 of the third planetary gearset PG3 can be connected by the third shifting element C to the sun gear 104 of the fourth planetary gearset PG4. The planetary gearwheel 113 of the third planetary gearset PG3 is mounted to rotate on the carrier 123 of the third planetary gearset PG3 and the carrier 123 of the third planetary gearset PG3 is connected to the carrier 124 of the fourth planetary gearset 4 in a rotationally fixed manner. The planetary gearwheel 114 of the fourth planetary gearset PG4 is mounted to rotate on the carrier 124 thereof. The two carriers 123 and 124 of the third and fourth planetary gearsets PG3 and PG4 connected rotationally fixed to one another are in turn connected rotationally fixed to a third transmission shaft GW3, which here forms the drive output shaft AW. The sun gear 104 of the fourth planetary gearset PG4 is connected rotationally fixed to the second transmission shaft GW2 as described earlier, and is therefore also connected in a rotationally fixed manner to the ring gear 131 of the first planetary gearset PG1. The ring gear 134 of the fourth planetary gearset PG4 can be coupled by means of the third dual shifting element E/F, which combines the two shifting elements E and F. By means of the fifth shifting element E, the ring gear 134 of the fourth planetary gearset PG4 can be connected to the housing G. When E is closed, the ring gear 104 and the sun gear 103 of the third planetary gearset PG3 are connected to and thus fixed relative to the housing G. By means of the sixth shifting element F the ring gear 134 of the fourth planetary gearset PG4 can be connected to the third transmission shaft GW3 or drive output shaft AW.

The nesting of the third and fourth planetary gearsets PG3 and PG4 is possible because of a quantitatively small fixed transmission ratio i0 of the outer, third planetary gearset PG3. The fixed transmission ratio i0_PG3 of the third planetary gearset PG3 is equal to i0_PG3=−1.42, which means that its sun gear has a large diameter.

The frictional shifting elements, i.e. the clutch K1 and the brake B2, in another example embodiment of the transmission according to FIG. 2 (not shown), can also be designed in a nested configuration at the periphery of the first and second planetary gearsets PG1 and PG2. The advantage of such nesting is that axial fitting space is saved thereby.

Figure 3A:
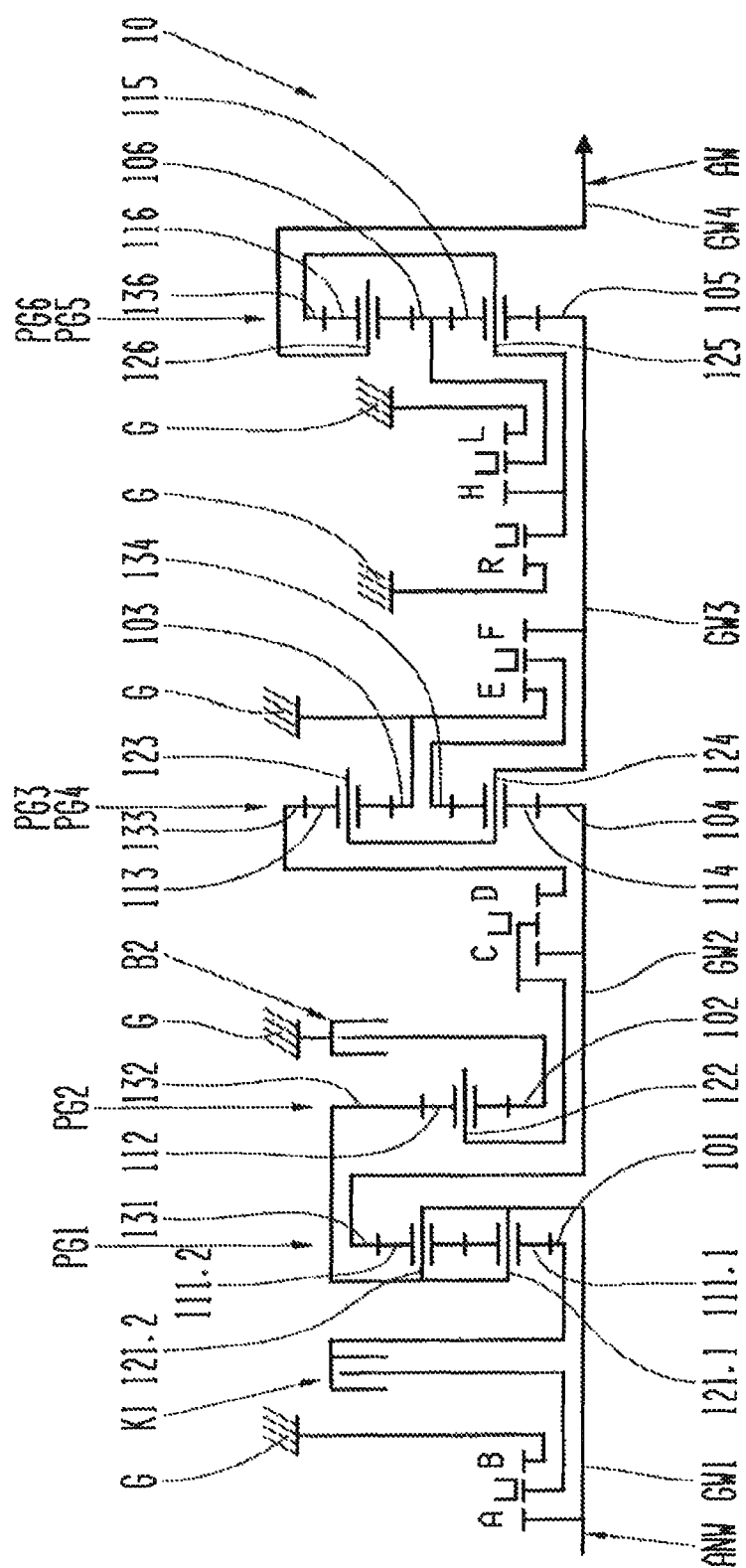
FIG. 3a: A transmission according to a third embodiment of the present invention.

FIG. 3a shows a third embodiment of a transmission according to the present invention.

FIG. 3a shows still another embodiment of the multiple-gear transmission according to FIG. 1a. The structure of the multiple-gear transmission 10 in FIG. 3a corresponds essentially to that of the variant of the transmission 10 shown previously in FIG. 2, so that reference should be made to the embodiments in FIG. 2 and correspondingly also to FIGS. 1a to 1c. The transmission 10 shown in FIG. 3a can for example be made in the form of a dual clutch transmission with a 14-gear DD (direct drive, i.e. the highest gear is a direct gear) of planetary design. Below, the transmission will be called the main transmission 1, extended by a range group with three ranges (Low, High and R).

The transmission 10 of FIG. 3a differs from the transmission 10 according to FIG. 2 in that additional, fifth and sixth planetary gearsets PG5 and PG6 as well as three additional shifting elements R, H and L are provided. The shifting elements H and L are combined in a dual shifting element H/L.

The two additional planetary gearsets PG5 and PG6 are now connected in the following manner: the carrier 124 of the fourth planetary gearset PG4 is connected by means of the third transmission shaft GW3, to the sun gear 105 of the fifth planetary gearset PG5 in a rotationally fixed manner. Correspondingly, the carrier 124 of the fourth planetary gearset PG4 is connected rotationally fixed to the sun gear 105 of the fifth planetary gearset PG5. The fifth planetary gearset PG5 has a planetary gearwheel 115, which is mounted to rotate on a carrier 125 of the fifth planetary gearset PG5. Furthermore, the carrier 125 is connected rotationally fixed to a ring gear 136 of the sixth planetary gearset PG6. The sixth planetary gearset PG6 also comprises a planetary gearwheel 116, which is mounted to rotate on a carrier 126 of the sixth planetary gearset PG6. The carrier 126 of the sixth planetary gearset PG6 is connected rotationally fixed to a fourth transmission shaft GW4, which for example forms the drive output shaft AW.

As described earlier, an additional, seventh shifting element R is provided. When actuated or closed, this seventh shifting element R connects the carrier 125 of the fifth planetary gearset PG5 to the housing G. Moreover, the dual shifting element H/L is also provided. By means of the eighth shifting element H, the carrier 125 of the fifth planetary gearset PG5 can be connected or coupled to the sun gear 106 of the sixth planetary gearset PG6. By means of the ninth shifting element L, the sun gear 106 of the sixth planetary gearset PG6 can be connected to the housing G.

The so-termed range group, with which at least one reversing gear or R-gear for short can be obtained, comprises the inner, fifth planetary gearset PG5 and the outer, sixth planetary gearset PG6 as well as the three additional shifting elements L, H and R. In the embodiment shown in FIG. 3a the number of gears of the main transmission 1 can be doubled by one of the shifting elements L, H, R. The 7-to-8 shift, i.e. the gearshift from the seventh gear V7 to the eighth gear V8, takes place with traction force interruption. A change from L for "Low" to H for "High" takes place. This enables the transmission to be used in commercial vehicles in particular. The gear interval V7 to V8, i.e. the gear interval from the seventh gear V7 to the eighth gear V8, can for example be chosen to be smaller, because of the speed loss during the traction force interrupted gearshift. All the reversing or R-gears can be powershifted between one another. The shift from forward to reverse using the shifting elements L and R cannot be a powershift.

An advantage of this embodiment is that all the shifting elements A to F and the clutch K1 and the brake B2 are accessible from outside.

This extension with a range group, an example of which is shown in FIG. 3a, is possible with all the main transmission variants described in the present application. In this, the range group can provide at least one reversing gear.

FIG. 3b shows a gear ratio scheme for a transmission as in FIG. 3a.

FIG. 3b shows as an example a transmission ratio table for gear ratios of the six planetary gearsets PG1 to PG6 of the transmission in FIG. 3a. In the table a respective fixed transmission ratio i0 for the planetary gearsets PG1 to PG6 and a respective transmission ratio i_PG for the planetary gearsets PG1 to PG6 are indicated.

FIG. 3C shows a shifting matrix for a transmission as in FIG. 3a.

FIG. 3C shows as an example a shifting matrix for the transmission in FIG. 3a. In the shifting matrix shown in FIG. 3c crosses are only entered for those of the shifting elements, i.e. the shifting elements A to F, L, H and R, the clutch K1 and the brake B2, which are needed for each of the forward gears V1 to V14 and the reverse gears R1 to R7, and which are actuated or closed in the gear concerned, and which are otherwise open. The next to last column of the shifting matrix, again shows examples of the gear ratios i of the engaged forward gears V1 to V14 and reversing gears R1 to R7. In addition, the last column of the shifting matrix shows the resulting transmission ratio phi of the gear next-lower than the forward gear V1 to V14 or reversing gear R1 to R7 concerned. Thus, by means of the transmission according to FIG. 3a at least 14 forward gears and at least seven reversing gears can be obtained.

FIG. 4a shows a fourth embodiment of a transmission according to the present invention.

FIG. 4a shows a variant of the multiple-gear transmission shown in FIG. 2. The structure of the multiple-gear transmission 10 in FIG. 4a corresponds essentially to the transmission 1 in FIG. 2, so that in order to avoid unnecessary repetitions, as regards its structure reference should be made to the description relating to FIG. 2 and correspondingly also to FIGS. 1a to 1c. The transmission 10 shown in FIG. 4a is a variant of the 7-gear DD transmission with block rotation of the third planetary gearset PG3.

The multiple-gear transmission 10 in FIG. 4a differs from the transmission in FIG. 2 in that in FIG. 4a the ring gear of the third planetary gearset PG3 can be connected to the sun gear 103 of the third planetary gearset PG3 by means of an additional, seventh shifting element J. To connect the sun gear 103 of the third planetary gearset PG3 to the housing G, in addition a further, eighth shifting element K is provided which, when it is actuated or closed, connects the sun gear 103 to the housing G. The additional, fourth dual shifting element J/K enables the planetary gearset PG3 to rotate as a block in all the forward gears except for the fourth forward gear. In the fourth forward gear the fourth shifting element D is closed and the force and torque flow passes by way of the transmission ratio provided by the third planetary gearset PG3. For block rotation at the third planetary gearset PG3, the seventh shifting element J is actuated or closed in all gears except for the fourth forward gear.

In another embodiment of the transmission according to FIG. 4a, in the sixth forward gear, instead of the third shifting element C the fourth shifting element D can also be or remain closed. Block rotation always produces a transmission ratio of 1. When the fourth forward gear is required, the sun gear 103 of the third planetary gearset PG3 has to be braked by the eighth shifting element K. In yet another embodiment of the transmission (not shown), the seventh shifting element J can also be designed such that it connects the sun gear 103 of the third planetary gearset PG3 to the carrier 123 of the third planetary gearset PG3. An advantage of the transmission according to FIG. 4a is that by virtue of the block rotation at the third planetary gearset PG3 drag losses due to gearwheels that are rotating free from load and rotating planetary gearwheels and their planetary mountings in the third planetary gearset PG3 are avoided.

FIG. 4b shows as an example a shifting matrix for the transmission in FIG. 4a. In the shifting matrix shown in FIG. 4b crosses are only entered for those of the shifting elements, i.e. the shifting elements A to F, the clutch K1 and the brake B2, which are needed for the respective forward gears V1 to V7 and which are actuated or closed in the gear concerned. However, other shifting elements too can be actuated or closed in order to preselect a gear in the other partial transmission or to produce defined rotational speeds at all the shafts, etc. The next to last column of the shifting matrix shows as examples the gear ratios i of the engaged forward gears V1 to V7. The last column of the shifting matrix again shows the resulting transmission ratios phi of the forward gear next-lower than the forward gear V1 to V7 concerned. Thus, by means of the transmission according to FIG. 4a at least seven forward gears can be obtained.

FIG. 5 shows a fifth embodiment of a transmission according to the present invention.

In this case FIG. 5 shows a variant of the multiple-gear transmission according to FIG. 1a. The structure of the multiple-gear transmission 10 in FIG. 5 corresponds to the transmission 1 in FIG. 1a, so that reference should be made to the description relating to FIGS. 1a to 1c.

The transmission 10 as shown in FIG. 5 comprises a second clutch K2, in contrast to the transmission 1 according to FIG. 1a. In the embodiment shown in FIG. 5 the second clutch K2 is arranged in the force and torque flow between the carrier 121.1 or 121.2 and the ring gear 132 of the second planetary gearset PG2. When it is actuated or closed, the second clutch K2 connects the two carriers 121.1 and 121.2 of the second planetary gearset PG2, which are connected rotationally fixed to one another, to the ring gear 132 of the second planetary gearset PG2.

In the example embodiment of FIG. 5, instead of the brake B2 on the sun gear 102 of the second planetary gearset PG2 as in the transmission 1 according to FIG. 1a, the force and torque flow via the second partial transmission TG2 can also be connected through by means of the second clutch K2. In that case the second clutch K2 connects the drive input shaft ANW, which is connected to the two carriers 121.1 and 121.2 of the first planetary gearset PG1 in a rotationally fixed manner, to the input shaft of the partial transmission TG2 or the ring gear 132 of the second planetary gearset PG2.

There are differences in the design of the frictional shifting element, i.e. the second clutch K2, compared with a brake B2. In each case there are other torque support factors and other rotational speed differences at the respective shifting elements. The corresponding shifting matrix remains the same except only in that instead of the brake B2, it is now the clutch K2 that has to be closed.

In a variant of the transmission according to FIG. 5 (not shown), the second clutch K2 is arranged between the carrier 122 of the second planetary gearset PG2 and the second dual shifting element C/D. There are then again other torque support factors and other rotational speed differences at the respective shifting elements.

In yet a further variant of the transmission according to FIG. 5 (not shown), the first clutch K1 is arranged between the ring gear 131 of the first planetary gearset PG1 and the sun gear 104 of the fourth planetary gearset PG4, but still torque-technically before the third shifting element C. In this case the first clutch K1 is arranged internally. Furthermore, a higher torque support factor is produced.

Figure 6A:
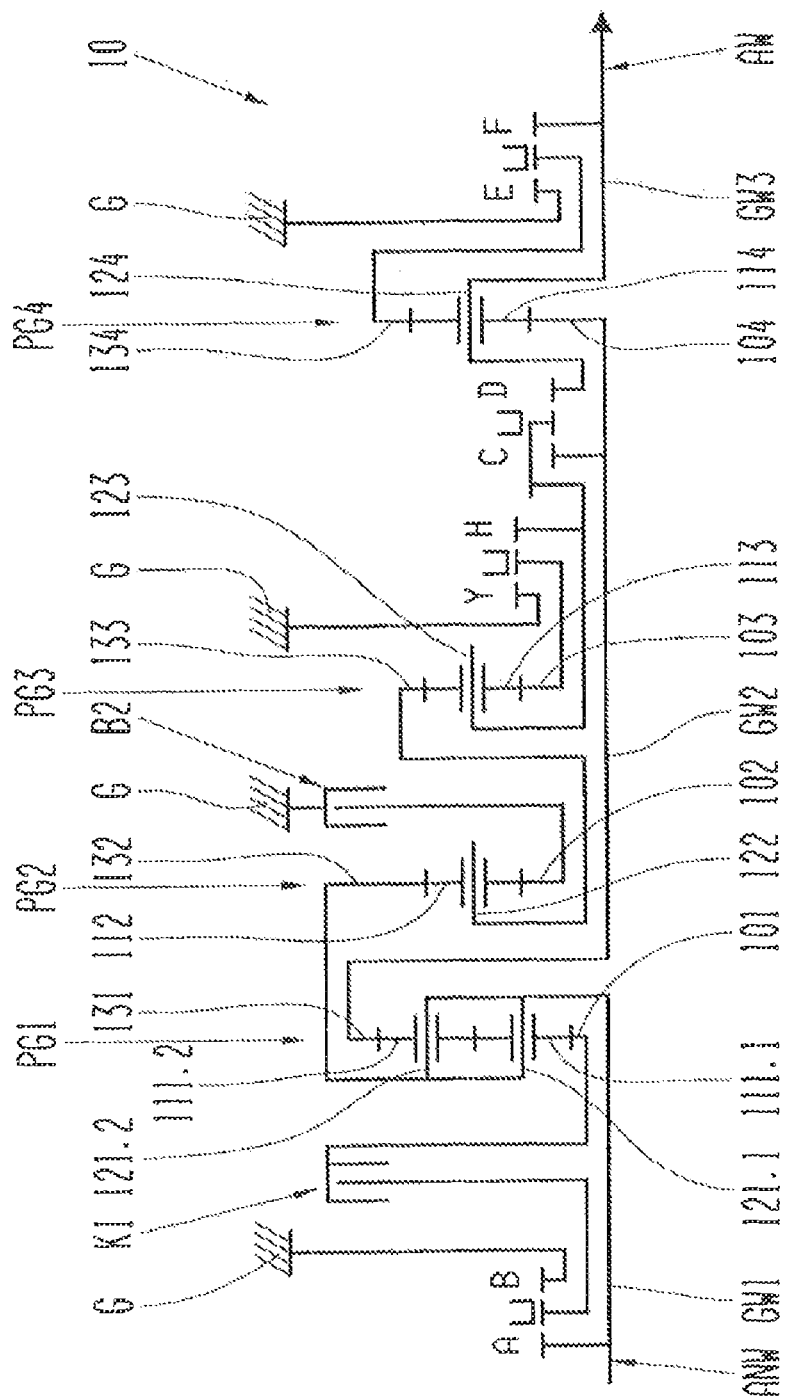
FIG. 6a: A transmission according to a sixth embodiment of the present invention.

FIG. 6a shows a sixth embodiment of a transmission according to the present invention.

FIG. 6a shows a further embodiment based on the transmission 1 according to FIG. 1a, wherein the multiple-gear transmission 10 in FIG. 6a can for example be designed as an 8-gear DD (direct drive, i.e. the highest gear is a direct gear) dual clutch transmission. The previous gearset of the 7-gear DD transmission as shown for example in FIG. 1a is extended by an additional, fourth dual shifting element Y/H to become an 8-gear DD transmission. The dual shifting element Y/H combines a seventh shifting element Y and an eighth shifting element H. Compared with the 7-gear DD transmission with seven forward gears an additional, short forward gear is available. The transmission ratio is determined by the second partial transmission TG2. For this, the second, third and fourth planetary gearsets PG2, PG3 and PG4 co-operate to produce the new first forward gear, as is also shown in the shifting matrix according to FIG. 6c below.

As shown in FIG. 6a, the carrier 122 of the second planetary gearset PG2 is connected rotationally fixed to the ring gear 133 of the third planetary gearset PG3. The sun gear 103 of the third planetary gearset PG3 can be connected to the housing G by means of the seventh shifting element Y. In turn, by means of the eighth shifting element H of the dual shifting element Y/H, the sun gear 103 of the third planetary gearset PG3 can be coupled to the carrier 123 of the third planetary gearset PG3. When the third shifting element C is actuated or closed, the carrier 123 of the third planetary gearset PG3 is connected to the second transmission shaft GW2 and to the sun gear 104 of the fourth planetary gearset PG4 connected in a rotationally fixed manner to the second transmission shaft GW2. On the other hand, when the fourth shifting element D in the second dual shifting element C/D is actuated or closed, the carrier 123 of the third planetary gearset PG3 is connected to the carrier 124 of the fourth planetary gearset PG4, which is in turn connected rotationally fixed to the third transmission shaft GW3, here forming the drive output shaft AW.

FIG. 6b shows a gear ratio scheme for a transmission as in FIG. 6a.

In this case FIG. 6b shows as an example, a transmission ratio table for transmission ratios of the four planetary gearsets PG1 to PG4 of the transmission in FIG. 6a. The table shows a respective fixed transmission ratio i0 for the planetary gearsets PG1 to PG4 and a respective planetary gearset transmission ratio i_PG for the planetary gearsets PG1 to PG4.

FIG. 6c shows a shifting matrix for a transmission as in FIG. 6a.

FIG. 6c shows an example shifting matrix for the transmission according to FIG. 6a. In the shifting matrix shown in FIG. 6c, crosses are only entered for those of the shifting elements, i.e. the four dual shifting elements A/B, C/D, E/F and Y/H, the clutch K1 and the brake B2, which are needed for the respective forward gears V1 to V8 and are actuated or closed in the gear concerned. However, other shifting elements too can be actuated or closed in order to pre-select a gear in the other partial transmission or to produce defined rotational speeds at all the shafts, etc. The next to last column of the shifting matrix again shows as examples the gear ratios i of the engaged forward gears V1 to V8. In addition, the last column of the shifting matrix shows the resulting transmission ratio phi of the forward gear next-lower than the forward gear V1 to V8 concerned.

In a variant of the transmission, in the seventh forward gear V7, instead of the third shifting element C the fourth shifting element D can also be closed. In that case the sixth shifting element F is free from load.

Figure 7A:
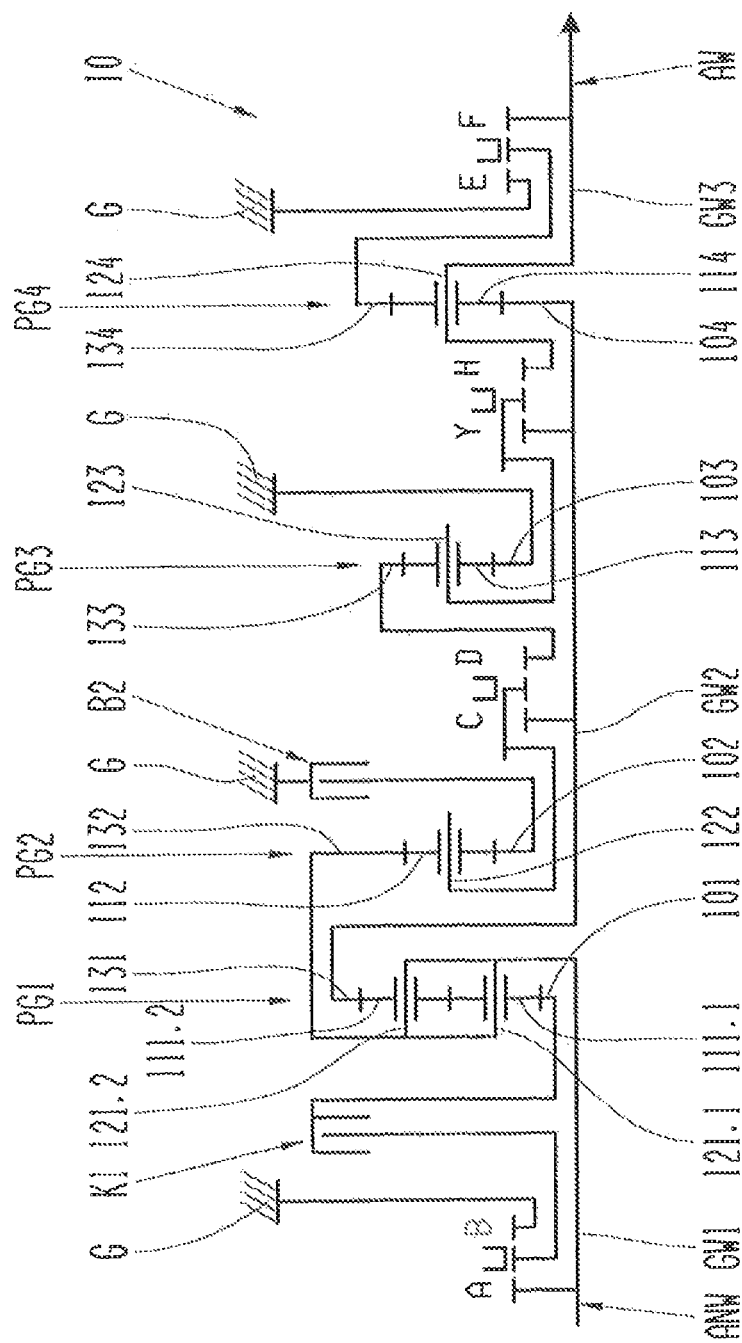
FIG. 7a: A transmission according to a seventh embodiment of the present invention.

FIG. 7a shows a seventh embodiment of a transmission according to the present invention.

In this case FIG. 7a shows a further embodiment based on the transmission according to FIG. 1a. Like the multiple-gear transmission in FIG. 6a, the multiple-gear transmission 10 in FIG. 7a can be designed as an 8-gear DO (direct drive, i.e. the highest gear is a direct gear) dual clutch transmission. The previous gearset of the 7-gear DD transmission, as shown for example in FIG. 1a, is extended by the additional, fourth dual shifting element Y/H to become an 8-gear DD transmission. Compared with the 7-gear DD transmission there is an additional, shorter forward gear. The transmission ratio is determined by the second partial transmission TG2. In this case the second, third and fourth planetary gearsets PG2, PG3 and PG4 co-operate to produce the new first forward gear, as is also shown in the shifting matrix of FIG. 7c, below.

Compared with the transmission shown previously in FIG. 6a, the transmission in FIG. 7a has a different arrangement of the dual shifting elements C/D and Y/H. When the seventh shifting element Y is actuated or closed, the carrier 123 of the third planetary gearset PG3 is connected to the sun gear 104 of the fourth planetary gearset PG4. The sun gear 104 is connected rotationally fixed to the ring gear of the first planetary gearset PG1 by way of the second transmission shaft GW2. In contrast, when the eighth shifting element H of the dual shifting element Y/H is actuated or engaged, the carrier 123 of the third planetary gearset PG3 is connected to the carrier 124 of the fourth planetary gearset PG4. In turn, that carrier 124 is connected in a rotationally fixed manner to the third transmission shaft GW3, here in the form of the drive output shaft AW.

FIG. 7b shows a gear ratio scheme for a transmission as in FIG. 7a.

FIG. 7b shows as an example a transmission ratio table for transmission ratios of the planetary gearsets PG1 to PG4 of the transmission in FIG. 7a. The table shows a respective fixed transmission ratio i0 for the planetary gearsets PG1 to PG4 and a respective planetary gearset transmission ratio i_PG for the planetary gearsets PG1 to PG4.

FIG. 7c shows a shifting matrix for a transmission as in FIG. 7a.

FIG. 7c shows as an example a shifting matrix for the transmission according to FIG. 7a. In the shifting matrix of FIG. 7c crosses are only entered for those of the shifting elements, i.e. the four dual shifting elements A/B, C/D, E/F and Y/H, the clutch K1 and the brake B2, which are needed for the respective forward gears V1 to V8 and are activated or closed in the gear concerned. However, further shifting elements too can be actuated or closed in order to pre-select a gear in the other partial transmission or in order to produce defined rotational speeds at all the shafts, etc. The next to last column of the shifting matrix shows as examples the gear ratios i of the engaged forward gears V1 to V8. In the last column of the shifting matrix, in addition the resulting transmission ratio phi of the forward gear next-lower than the forward gear V1 to V8 concerned is shown. Thus, by means of the transmission according to FIG. 7a at least 8 forward gears can be obtained.

Figure 8A:
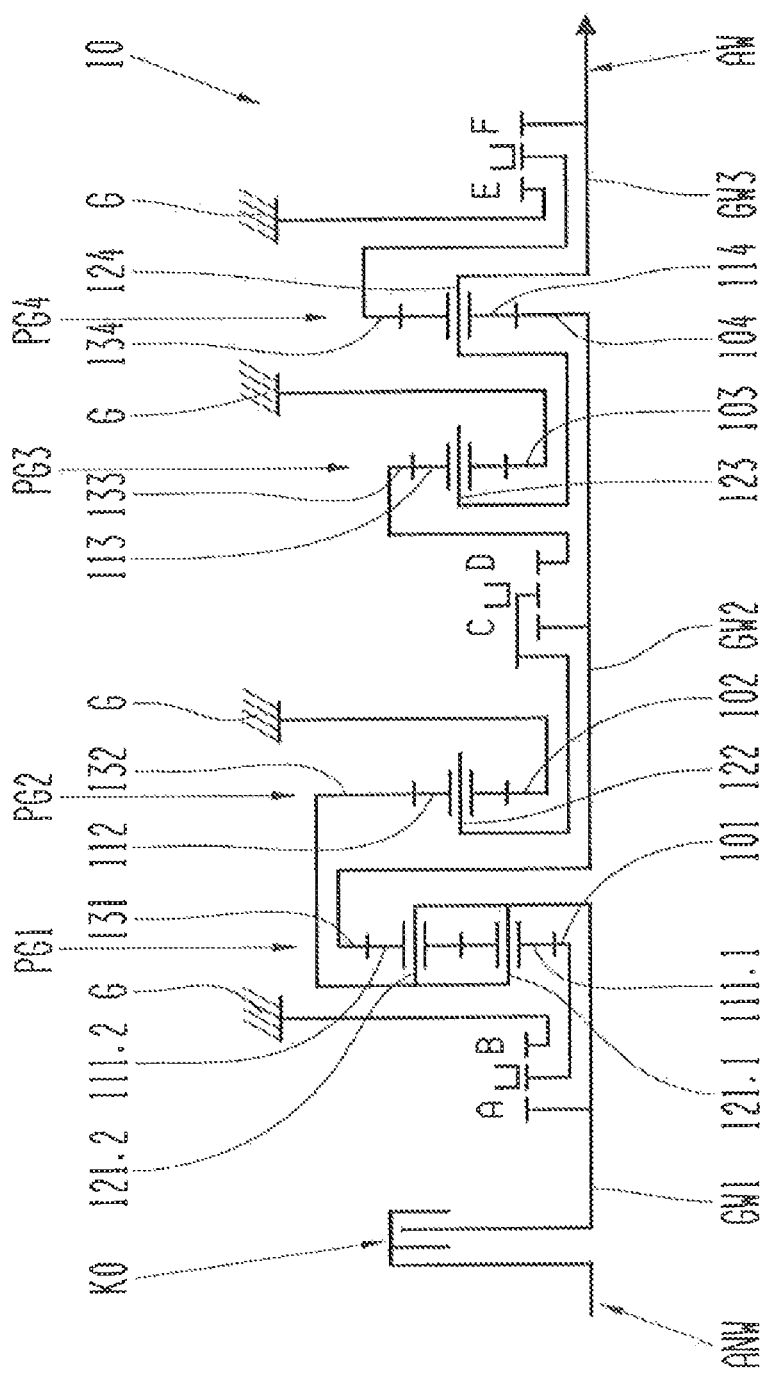
FIG. 8a: A transmission according to a eighth embodiment of the present invention.

FIG. 8a shows an eighth embodiment of a transmission according to the present invention.

FIG. 8a shows yet another embodiment of a transmission 10 based on the transmission 1 according to FIG. 1a. Like the multiple-gear transmission in FIG. 1a, the multiple-gear transmission 10 in FIG. 8a can be designed as a 7-gear DD (direct drive, i.e. the highest gear is a direct gear) dual clutch transmission, and more precisely for example as an automated multiple-gear transmission (AMT).

The multiple-gear transmission 10 in FIG. 8a differs from the transmission 1 of FIG. 1a in that the two powershift elements K1 and B2 in FIG. 1a, or correspondingly the powershift element K2 in FIG. 5, are replaced by fixed connections. This produces an automated multi-gear transmission (AMT) that cannot be powershifted. Gearshifts are then only possible with traction force interruption. In addition, a separator clutch K0 is provided as a conventional starting clutch.

As shown in FIG. 8a, the sun gear 101 of the first planetary gearset PG1 can be coupled directly by means of the first dual shifting element A/B instead of providing a clutch K1 as in FIG. 1a for connecting the sun gear 101 to the first dual shifting element A/B. Furthermore, the sun gear 102 of the second planetary gearset PG2 is connected to the housing G and is thus fixed relative to the housing instead of being able, as in FIG. 1a, to be connected to the housing G by means of the brake B2. By means of a separator clutch K0, when it is actuated or closed a drive engine is connected to the input shaft of the transmission 1. In this case the input shaft or first transmission shaft GW1 is connected to the two carriers 111.1 and 111.2 of the first planetary gearset PG1 in a rotationally fixed manner.

In the transmission according to FIG. 8a there is no reversing gear or R-gear for short. Accordingly an additional assembly can be provided, for example a combination with a range group having an integrated reversing gear or a reversing gear stage.

The embodiment of the transmission shown in FIG. 8a has the advantage of being an inexpensive transmission. Moreover, by virtue of the omission of the powershift elements the efficiency can be increased. In addition the main transmission can be used as a module, for example for a powershift transmission (similar to DOT) or as an automated transmission with traction force interruption.

In a variant of the transmission in FIG. 8a (not shown), instead of the sun gear 103 of the third planetary gearset PG3 fixed to the housing a conjoint component consisting of the sun gear 103 of the third planetary gearset PG3 and the ring gear 104 of the fourth planetary gearset PG4 is provided. This is particularly appropriate when the third and fourth planetary gearsets PG3 and PG4 are nested, and has the advantage that the third planetary gearset PG3 can rotate as a block when the sixth shifting element F is closed. In that case there are no bearing losses at the planetary gearwheels 113 of the third planetary gearset PG3. A preparatory background shift by means of the fifth shifting element E and the sixth shifting element F is no longer possible, which results in a longer shift duration from the fourth forward gear V4 to the fifth forward gear V5. In the shifting matrix shown in FIG. 8c below, in the fourth forward gear V4 the fifth shifting element E must remain closed in order to keep the sun gear 103 fixed to the housing.

FIG. 8b shows a gear ratio matrix for a transmission as in FIG. 8a.

FIG. 8b shows as an example a transmission ratio table for transmission ratios of the four planetary gearsets PG1 to PG4 of the transmission according to FIG. 8a. In this, respective fixed transmission ratios i0 for the planetary gearsets PG1 to PG4 and respective transmission ratios i_PG for the planetary gearsets PG1 to PG4 are shown.

FIG. 8c shows a shifting matrix for a transmission as in FIG. 8a.

FIG. 8c shows as an example a shifting matrix for the transmission 10 according to FIG. 8a. In the shifting matrix shown in FIG. 8c crosses are only entered for those of the shifting elements, i.e. the three dual shifting elements A/B, C/D and E/F and the clutch K0, which are needed for the respective forward gears V1 to V7 and which are actuated or closed in the gear concerned. The next to last column of the shifting matrix shows as examples the gear ratios i of the engaged forward gears V1 to V7. In addition, the last column of the shifting matrix shows the resulting transmission ratio phi of the forward gear next-lower than the forward gear V1 to V7 concerned. Thus, by means of the transmission according to FIG. 8a at least 7 forward gears can be obtained.

Figure 9A:
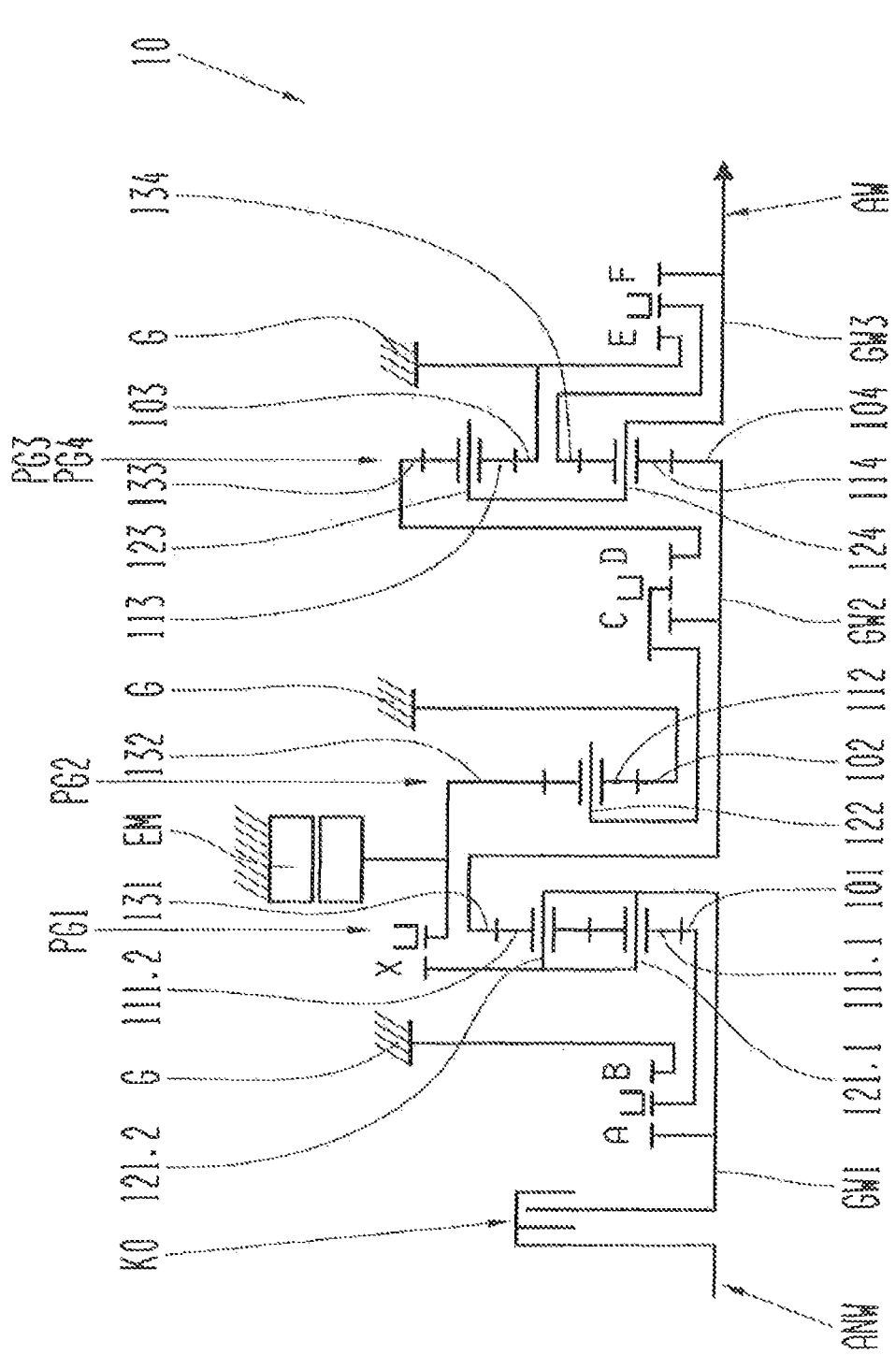
FIG. 9a: A transmission according to a ninth embodiment of the present invention.

FIG. 9a shows a ninth embodiment of a transmission according to the present invention.

FIG. 9a shows still another multiple-gear transmission 10. In this case the multiple-gear transmission 10 is a variant of the transmission 10 shown in FIG. 2. The structure of the multiple-gear transmission 10 corresponds essentially to the transmission in FIG. 2, so as regards the structure of the multiple-gear transmission 10 references should be made to the description relating to FIG. 2 and connected therewith, also to the description relating to FIGS. 1a to 1c. The transmission 10 shown in FIG. 9a is a hybrid transmission which is a variant of the 7-gear DD transmission of planetary design, and in which the traction force can additionally be supported by means of an electric machine EM.

The multiple-gear transmission 10 in FIG. 9a differs from the transmission 10 in FIG. 2, in that the first clutch K1 is omitted. Instead, a separator clutch K0 is provided, as in the previous case of FIG. 8a. The separator clutch K0 serves as a conventional starting clutch and connects a drive engine or internal combustion engine to the input shaft of the transmission 10. In the example embodiment of FIG. 9a the drive engine is coupled to the first partial transmission TG1 solely by the first and second shifting elements A and B which, for example, are combined in the first dual shifting element A/B.

Furthermore, in the transmission variant shown in FIG. 9a the brake B2 in FIG. 1a or the corresponding clutch K2 in FIG. 5 is replaced by an additional shifting element X. When this additional shifting element X is actuated or closed, it connects the input shaft and the carriers 111.1, 111.2 of the first planetary gearset PG1 connected rotationally fixed thereto, to the ring gear 132 of the second planetary gearset PG2. This couples the drive engine to the second partial transmission TG2. In addition, an electric machine EM is provided for powershifting, during which the traction force is always supported by the electric machine EM by way of the second partial transmission TG2. When a gearshift takes place in the second partial transmission TG2, the drive engine maintains a traction force via the first partial transmission TG1. This means that shifts always only take place alternately between the first partial transmission TG1 and the second partial transmission TG2.

A reversing gear or R-gear or reversing gear stage can be omitted, since for driving in reverse the electric machine EM is used, in particular by rotating backward in a forward gear.

The frictional separator clutch K0 is optional. It can be provided as a starting clutch if the electric machine EM is not powerful enough or if its energy store or electric accumulator is run down. The separator clutch K0 serves for opening during transmission synchronization. As in an automated transmission, the shift then takes place in the first partial transmission TG1. The second partial transmission TG2, i.e. the second dual shifting element CO, is always synchronized by regulating the rotational speed of the electric machine EM.

FIG. 9b shows a gear ratio scheme for a transmission as in FIG. 9a.

FIG. 9b shows as an example a transmission ratio table for transmission ratios of the four planetary gearsets PG1 to PG4 of the transmission according to FIG. 9a. In this, respective fixed transmission ratios i0 are shown for the planetary gearsets PG1 to PG4 and respective planetary gearset transmission ratios PG are shown for the planetary gearsets PG1 to PG4.

FIG. 9c shows a shifting matrix for a transmission as in FIG. 9a.

FIG. 9c shows an example shifting matrix for a transmission according to FIG. 9a. In the shifting matrix shown in FIG. 9c, crosses are only entered for those of the shifting elements, i.e. the tree dual shifting elements NB, C/D and E/F and the additional shifting element X as well as the clutch K0, which are needed for the respective forward gears V1 to V7 and which are actuated or closed in the gear concerned. The next to last column of the shifting matrix shows as examples the gear ratios i of the engaged forward gears V1 to V7. In addition, the last column of the shifting matrix shows the resulting transmission ratio phi of the forward gear next-lower than the forward gear V1 to V7 concerned. Thus, by means of the transmission according to FIG. 9a at least 7 forward gears V1 to V7 can be obtained.

Figure 10:
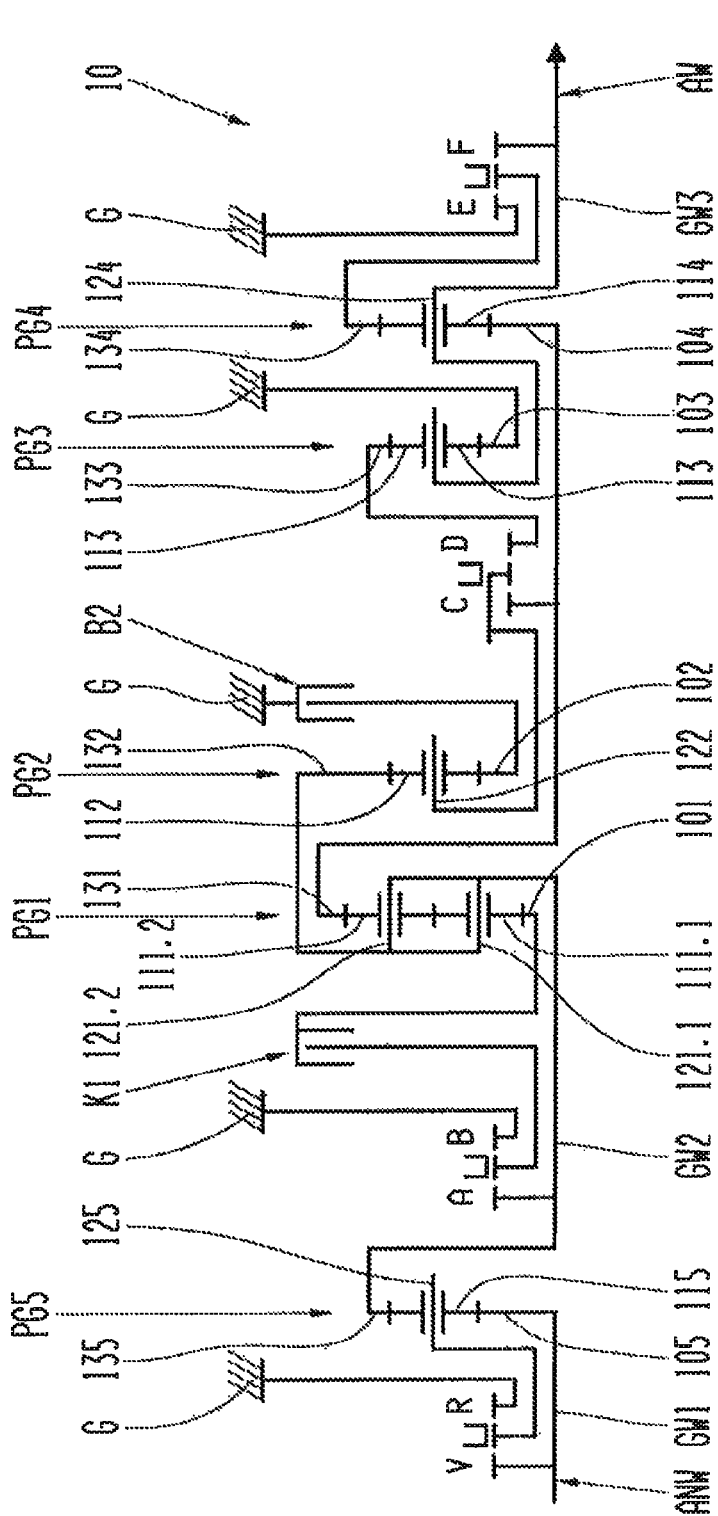
FIG. 10: A transmission according to a tenth embodiment of the present invention.

FIG. 10 shows a tenth embodiment of a transmission according to the present invention.

In this case FIG. 10 shows yet another multiple-gear transmission 10. The multiple-gear transmission 10 is a further variant of the transmission 1 in FIG. 1a. The structure of the multiple-gear transmission 10 corresponds essentially to the transmission 1 in FIG. 1a, so that as regards its structure reference should be made to the description relating to FIGS. 1a to 1c. The transmission 10 in FIG. 10 is a variant having at least one reversing gear or reversing gear stage in the form of a reversing gearset PG5 at the input of the transmission.

In contrast to the multiple-gear transmission 1 according to FIG. 1a, the transmission 10 according to the example embodiment in FIG. 10 comprises an additional, fifth planetary gearset PG5 and two additional shifting elements V and R, which for example are combined in a dual shifting element V/R. When the shifting element R is actuated, it connects the carrier 125 of the fifth planetary gearset PG5 to the housing G so that the carrier 125 is fixed relative to the housing, in order to provide at least one reversing gear. In contrast, when the shifting element V is actuated it connects the carrier 125 of the fifth planetary gearset PG5 to the drive input shaft ANW and to the sun gear 105 of the fifth planetary gearset PG5, which is connected rotationally fixed to the drive input shaft ANW, in order to obtain a forward gear.

To obtain a forward gear in the transmission 10, the shifting element V is always actuated or closed, and to obtain a reversing gear in the transmission 10, the shifting element R is always actuated or closed. The reversing gears are shorter than the corresponding forward gears (factor i0 of the fifth planetary gearset PG5). In the short reversing gears it may be necessary to limit the torque of the drive engine, since otherwise, owing to the torque loading, the reversing gear would be relevant for the design of the transmission. The short reversing gears have been found to be advantageous for sensitive maneuvering in reverse. A low driving speed is produced when the drive engine is idling with the clutch closed. Moreover, the reversing gears can be powershifted between one another.

Figure 11:
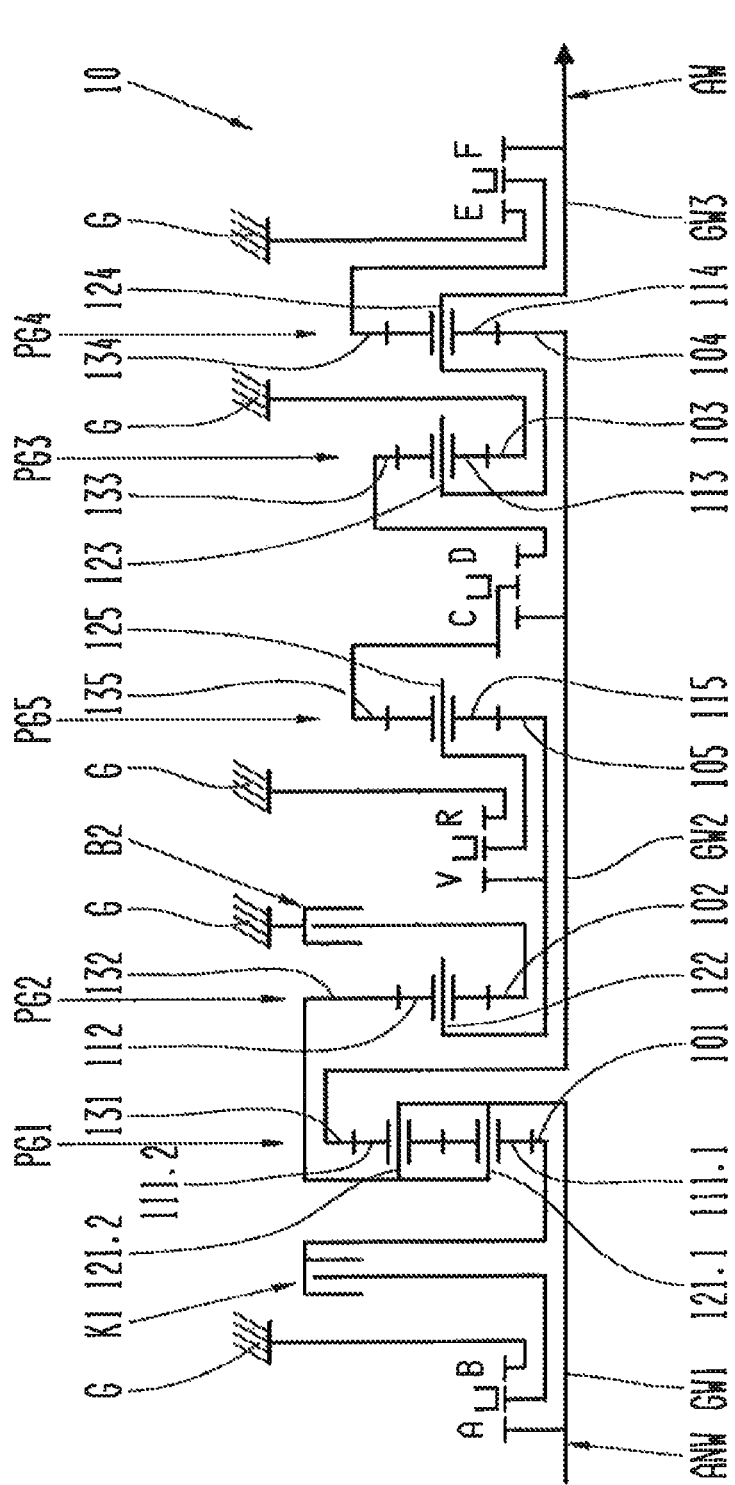
FIG. 11: A transmission according to a eleventh embodiment of the present invention.

FIG. 11 shows an eleventh embodiment of a transmission according to the present invention.

FIG. 11 shows another multiple-gear transmission 10, which is a variant of the transmission 1 according to FIG. 1a. The structure of this multiple-gear transmission 10 essentially corresponds to the transmission 1 in FIG. 1a, so that as regards its structure reference should be made to the description relating to FIGS. 1a to 1 c. The transmission 10 in FIG. 11 is a variant with a reversing gear in the form of the reversing gearset PG5 within the partial transmission TG2.

The transmission 10 according to the example embodiment in FIG. 11 differs from the multiple-gear transmission 1 of FIG. 1a in that it comprises an additional, fifth planetary gearset PG5 and two additional shifting elements V and R, which for example are combined in a fourth dual shifting element V/R. In this case the fifth planetary gearset PG5 is arranged in the form of a reversing gearset for the reversing gear, within the second partial transmission TG 2. The sun gear 105 of the fifth planetary gearset PG5 is connected rotationally fixed to the carrier 122 of the second planetary gearset PG2. The planetary gearwheel 115 of the fifth planetary gearset PG5 is mounted to rotate on a carrier 125 of the fifth planetary gearset PG5. Furthermore, the carrier 125 can be coupled by means of the fourth dual shifting element V/R. To obtain a reversing gear, by means of the eighth shifting element R, the carrier 125 of the fifth planetary gearset PG5 can be connected to the housing G so that it is fixed relative to the housing. To obtain a forward gear, by means of the seventh shifting element V, the carrier 125 of the fifth planetary gearset PG5 can be connected to the sun gear 105 of the fifth planetary gearset PG5.

Furthermore, the ring gear 135 of the fifth planetary gearset PG5 can be coupled by means of the second dual shifting element C/D. When the third shifting element C is actuated, it connects the ring gear 135 to the second transmission shaft GW2 and thus to the sun gear 104 of the fourth planetary gearset PG4, which is connected rotationally fixed to the second transmission shaft GW2. On the other hand, if the fourth shifting element D is actuated, it connects the ring gear 135 to the ring gear 133 of the third planetary gearset PG3.

In the forward gears of the transmission 1 the shifting element V is always actuated or closed, and in the reversing gears the shifting element R is always actuated or closed. The reversing gears are shorter than the corresponding forward gears of the second partial transmission TG2 (factor i0 of the fifth planetary gearset PG5). Moreover, the reversing gears cannot be powershifted between one another. In contrast, the change between forward and reversing gears can be powershifted when a forward gear is pre-selected in the first partial transmission TG1 and a reversing gear is pre-selected in the second partial transmission TG2. This is advantageous for dynamic reversing or rocking free from a depression.

Figure 12A:
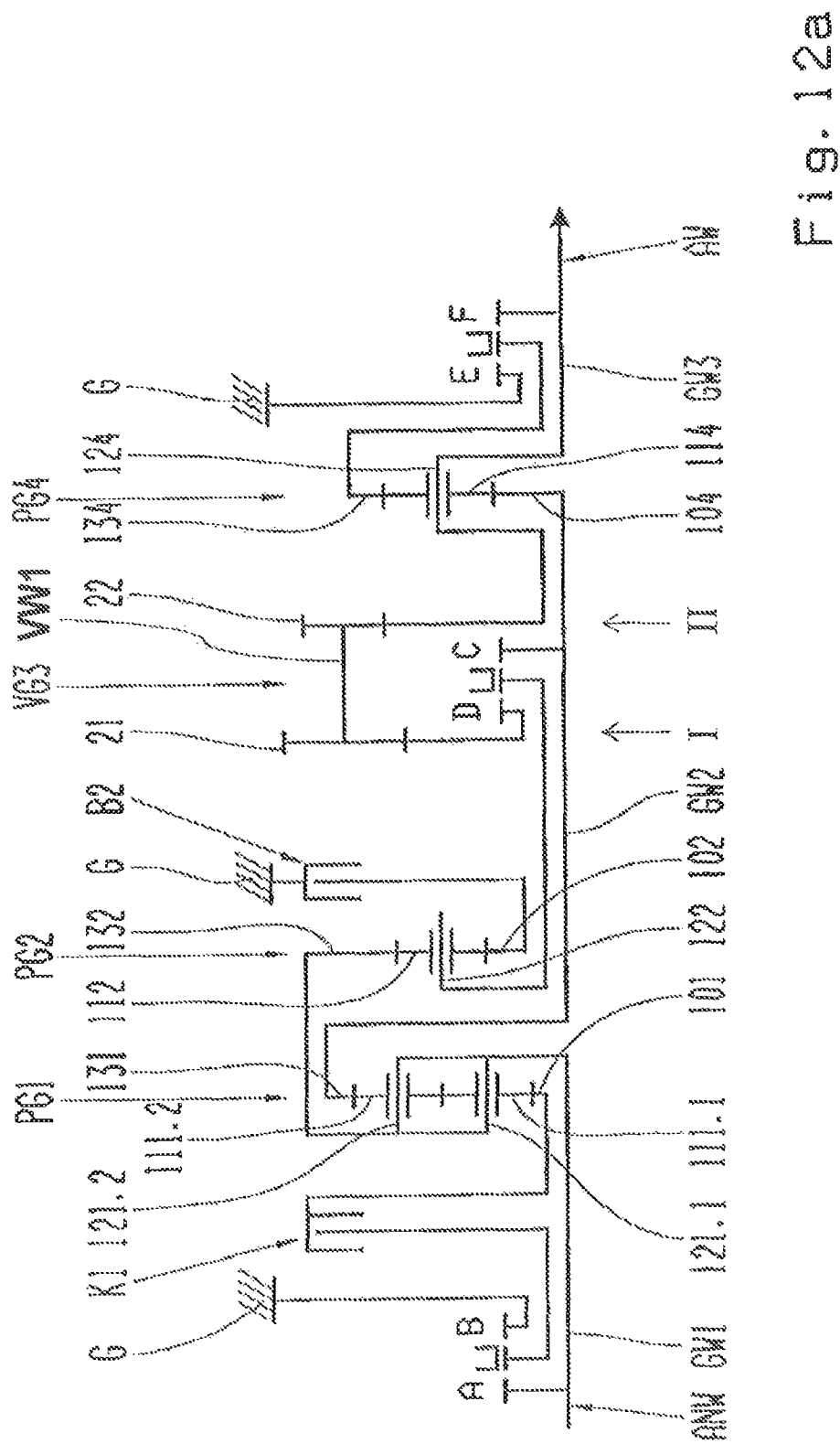
FIG. 12a: A transmission according to a twelfth embodiment of the present invention.

FIG. 12a shows a twelfth embodiment of a transmission according to the present invention.

FIG. 12a shows yet a further variant of the multiple-gear transmission according to FIG. 1a. The structure of this multiple-gear transmission 10 corresponds essentially to the transmission 1 in FIG. 1a, so that as regards the structure of the multiple-gear transmission 10 references should be made to the description relating to FIGS. 1a to 1c.

The transmission 10 shown in FIG. 12a can for example be designed as a 7-gear DD (direct drive) transmission. It differs from the transmission 1 in FIG. 1a, in that there are only three planetary gearsets, in this case the first, second and fourth planetary gearsets PG1, PG2 and PG4. The third planetary gearset PG3, in contrast, is omitted. Instead, an intermediate gear system VG3 is provided, which has a countershaft VW1 and two gearwheel planes, in particular in the form of spur gear stages I and II.

The transmission ratio $k^1$ previously provided by the third planetary gearset PG3, i.e. a double gear interval, is now produced by the two wheel planes I and II. In this case the transmission ratio of the intermediate gear system VG3 is similar to that of the third planetary gearset PG3, for example 1.7, by virtue of the two wheel planes I and II. The transmission shafts GW1, GW2, GW3 can be brought into driving connection with one another selectively by means of the two wheel planes I, II and six shifting elements A, B, C, D, E and F as well as the clutch K1 as a further shifting element. When the fourth shifting element D is actuated or closed, the first wheel plane I is connected to the sun gear 104 or the transmission shaft GW2. In turn, the second wheel plane II is always coupled to the carrier 124 of the fourth planetary gearset PG4 or the transmission shaft GW3, which forms the drive output shaft AW. When the third shifting element C of the dual shifting element C/D is actuated, it connects the carrier 122 of the second planetary gearset PG2 to the second transmission shaft GW2 and the sun gear 104 of the further planetary gearset PG4, which is connected rotationally fixed to the transmission shaft GW2.

An advantage of the transmission according to FIG. 12a is that the third planetary gearset PG3 has been omitted. The fixed transmission ratio i0 was in the extreme range. Thereby, a larger gear interval and a larger overall spread can be achieved. The omission of the third planetary gearset PG3 also eliminates the bearing losses associated with it. Since the carriers/planetary carriers of the third planetary gearset PG3 must be small, i.e. they must have a quantitatively extremely small fixed transmission ratio i0, high bearing rotational speeds result.

The third and fourth shifting elements C and D or the second dual shifting element C/D can be conventional shifting elements. This means that a central element is connected to a neighbor on the left or one on the right. This is a particularly space-saving arrangement.

The intermediate gearset VG3 in FIG. 12a can also be designed in a configuration (not shown) having two countershafts. The power division is then similar to a planetary gearset with a fixed carrier. It is advantageous in this, that radial forces on the main shaft can be compensated.

FIG. 12b shows a transmission ratio scheme for a transmission as in FIG. 12a.

FIG. 12b shows an example a transmission ratio table for transmission ratios of the three planetary gearsets, i.e. here the first, second and fourth planetary gearsets PG1, PG2 and PG4 of the transmission 10 in FIG. 12a. In this, respective fixed transmission ratios i0 for the planetary gearsets PG1, PG2 and PG4, and respective planetary gearset transmission ratios i_PG for the planetary gearsets PG1, PG2 and PG4 are shown. In addition, the transmission ratio i_VG3 is shown for the intermediate gearset VG3.

FIG. 12c shows a shifting matrix for a transmission as in FIG. 12a.

In the shifting matrix shown in FIG. 12c, crosses are only entered for those of the shifting elements, i.e. the six shifting elements A to F, the brake B2 and the clutch K1 which are needed for the respective forward gears V1 to V7 and which are actuated or closed in the gear concerned. The next to last column of the shifting matrix shows as examples the gear ratios i of the engaged forward gears V1 to V7. In addition, the last column of the shifting matrix shows the resulting transmission ratio phi of the forward gear next-lower than the forward gear V1 to V7 concerned. Thus, by means of the transmission according to FIG. 12a at least 7 forward gears can be obtained.

In a further variant (not shown) of the transmission in FIG. 12a, provided that the connection mode permits it the minus planetary gearset is replaced by a plus planetary gearset. For example, in order to provide a similar, desired transmission ratio, in this case the connections are correspondingly adapted, i.e. the carrier and the ring gear are interchanged.

In another variant (not shown) of the transmission according to FIG. 12a, a planetary gear stage is replaced by an intermediate gear stage. This can be done not only, for example, for the third planetary gearset PG3 as shown in FIG. 12a but also, for example, for the second planetary gearset PG2.

In another variant (not shown) of the transmission according to FIG. 12a, the reversing gear is provided in the form of a spur gear stage, for example by a further gearwheel plane in the intermediate gearset variant of the third planetary gearset PG3.

In yet another variant (not shown) of the transmission according to FIG. 12a, the two powershift elements K1 and K2 (or B2) are omitted as in the variant of the automated multi-gear transmission AMT shown in FIG. 7a. The first and second dual shifting elements A/B and C/D are then designed as powershift elements for the variants of the 7-gear DO transmission. This then produces powershift transmissions having four powershift elements and a group used in common, i.e. the fourth planetary gearset PG4, which is preselected while free from load with interlocking powershift elements E/F.

In summary, the present invention offers, among others, the advantages that the transmission has a compact structure that results in lower production costs and lower weight of the transmission. Moreover, the transmission provides a good range of transmission ratios, low inertial masses and a high power density. Furthermore, the present invention provides a large number of gears.

In addition, in the embodiments of the invention described above the shifting elements can be actuated easily, since preferably most or particularly preferably all of the shifting elements in the transmission are accessible from outside, in particular from outside by means of shifting forks.

Although the present invention has been described above with reference to preferred example embodiments, it is not limited to them but can be modified in many ways.

INDEXES 1, 10 Transmission
GW1, GW2, GW3, GW4 Transmission shafts
ANW Drive input shaft
AW Drive output shaft
G Housing
PG1, PG2, PG3, PG4, PG5, PG6 Planetary gearset
101, 102, 103, 104, 105, 106 Sun gear
111.1, 111.2, 111, 112, 113, 114, 115, 116 Planetary gearwheel
121.1, 121.2, 122, 123, 124, 125, 126 Carrier/planetary carrier
131, 132, 133, 134, 135, 136 Ring gear
VG3 Intermediate gear system
VW1 Countershaft
I, II Wheel plane
i0 Fixed transmission ratio
i_PG Gear ratio of the planetary gearset
i_VG3 Gear ratio of the intermediate gear system
k Gear interval
A, B, C, D, E, F, H, J, K, L, V, R, X, Y Shifting element
K1, K2, K0 Clutch
EM Electric machine
V1, V2, V3, V4, V5, V6, V7, V8, V9, V10 V11, V12, V13, V14 Forward gear
R1, R2, R3, R4, R5, R6, R7 Reversing gear

The invention claimed is:

1. A transmission (1, 10) for a motor vehicle, the transmission (1, 10) comprising:
   a housing (G),
   a drive input shaft (ANW),
   a drive output shaft (AW),
   at least first and second planetary gearsets (PG1, PG4), the first planetary gearset (PG4) comprising a sun gear (104), at least one planetary gearwheel (114), a planetary carrier (124) and a ring gear (134), as well as a plurality of shifting elements (A to F, H, J, K, L, V, R, X, Y), and the second planetary gearset (PG1) comprising at least two planetary gearwheels (111.1, 111.2) and two planetary carriers (121.1, 121.2) on which the respective planetary gearwheels (111.1, 111.2) are mounted to rotate,
   the two carriers (121.1, 121.2) of the second planetary gearset (PG1) being connected, in a rotationally fixed manner, to one another and to the drive input shaft (ANW), the carrier (124) of the first planetary gearset (PG4) being connected, in a rotationally fixed manner, to the drive output shaft (AW), a sun gear (101) of the second planetary gearset (PG1) being connectable, by at least one first shifting element (K1, B), to the housing (G) and the sun gear (101) of the second planetary gearset (PG1) being connectable, by at least one second shifting element (A), to the drive input shaft (ANW), the ring gear (134) of the first planetary gearset (PG4) being connectable, by a third shifting element (E), to the housing (G), and, by a fourth shifting element (F), to the carrier (124) of the first planetary gearset (PG4), the sun gear (104) of the first planetary gearset (PG4) and a ring gear (131) of the second planetary gearset (PG1) being connected, in a rotationally fixed manner, to one another, and all of the shifting elements (A, B, E, F, K1) being arranged in the housing (G) and being accessible from an outside.

2. The transmission according to claim 1, wherein the transmission further comprises at least one of third, fourth, fifth and sixth planetary gearsets (PG2, PG3, PG5, PG6) such that at least one of:

at least two of the first, the second, the third, the fourth, the fifth and the sixth planetary gearsets (PG1, PG2, PG3, PG4, PG5, PG6) are geometrically arranged, one behind another, in the transmission (1, 10); and at least two of the first, the third, the fifth and the sixth planetary gearsets (PG3, PG4; PG5, PG6) are arranged, in a nested manner, such that at least one of the first planetary gearset (PG4) is nested inside the fourth planetary gearset (PG3) and the fifth planetary gearset (PG5) is nested inside the sixth planetary gearset (PG6).

3. The transmission according to claim 2, wherein the third planetary gearset (PG2) is arranged either between the second and the fourth planetary gearsets (PG1, PG3), or between the first and the second planetary gearsets (PG4, PG1), or between the second and the fifth planetary gearsets (PG1, PG5), and a sun gear (102) of the third planetary gearset (PG2) is one of fixedly connected to the housing (G) or is connectable to the housing (G) by a fifth shifting element (B2, C).

4. The transmission according to claim 2, wherein a carrier (122) of the third planetary gearset (PG2) is at least one of:

rotationally fixed to a ring gear (133) of the fourth planetary gearset (PG3), connected to a sun gear (105) of the fifth planetary gearset (PG5), connectable by a sixth shifting element (C) to the sun gear (104) of the first planetary gearset (PG4), and connectable by a seventh shifting element (D) to the ring gear (133) of the fourth planetary gearset (PG3).

5. The transmission according to claim 2, wherein the carriers (111.1, 111.2) of the second planetary gearset (PG1) are either rotationally fixedly connected to a ring gear (132) of the third planetary gearset (PG2) or are connectable, by an eighth shifting element (X, K2), to the ring gear (132) of the third planetary gearset (PG2).

6. The transmission according to claim 1, wherein an electric machine (EM) is provided to enable obtaining at least one reversing gears of the transmission (1, 10).

7. The transmission according to claim 2, wherein a sun gear (103) of the fourth planetary gearset (PG3) is one of connected to the housing (G) or is connectable to the housing (G) by a ninth shifting element (K, Y).

8. The transmission according to claim 2, wherein a sun gear (103) of the fourth planetary gearset (PG3) is connectable, by a tenth shifting element (J), to a ring gear (133) of the fourth planetary gearset (PG3).

9. The transmission according to claim 1, wherein the ring gear (134) of the first planetary gearset (PG4) is at least one of:

rotationally fixedly connected to the sun gear (104) of the first planetary gearset (PG4), connectable by the third shifting element (E) to the housing (G), and connectable by the fourth shifting element (F) to the drive output shaft (AW).

10. The transmission according to claim 2, wherein the fifth planetary gearset (PG5) and the sixth planetary gearset (PG6) are arranged in a nested manner and form a reversing gear group, the reversing gear group is arranged on an output side of the transmission (1) and a sun gear (105) of the fifth planetary gearset (PG5) is rotationally fixedly connected to the carrier (124) of the first planetary gearset (PG4), a carrier (125) of the fifth planetary gearset (PG5) is connectable to the housing (G), by an eleventh shifting element (R), for obtaining at least one reversing gear (R1, R2, R3, R4, R5, R6, R7), and a sun gear (106) of the sixth planetary gearset (PG6) is connectable, by a twelfth shifting element (L), to the housing (G) and the sun gear (106) of the sixth planetary gearSet (PG6) is connectable, by a thirteenth shifting element (H), to the carrier (125) of the fifth planetary gearset (PG5).

11. The transmission according to claim 2, wherein the fifth planetary gearset (PG5) is arranged on an input side of the transmission (1) and a sun gear (105) of the fifth planetary gearset (PG5) is rotationally fixedly connected to the drive input shaft (ANW), and a carrier (125) of the fifth planetary gearset (PG5) is either:
connectable to the housing (G), by an eleventh shifting element (R), in order to produce at least one reversing gear (R1, R2, R3, R4, R5, R6, R7), or
connectable, by a further shifting element (V), to the drive input shaft (ANW) in order to implement at least one forward gear (V1, V2, V3, V4, V5, V6, V7, V8, V9, V10, V11, V12, V13, V14).

12. The transmission according to claim 1, wherein the first planetary gearset (PG4) and the second planetary gearset (PG1) form a first partial transmission (TG1), and the first planetary gearset (PG4) together with a third planetary gearset (PG2) and a fourth planetary gearset (PG3) form a second partial transmission (TG2).

13. The transmission according to claim 1, wherein an intermediate gear system (VG3) is provided such that the intermediate gear system (VG3) comprises at least one countershaft (VW1) and at least two gearwheel planes (I, II) of which a first gearwheel plane (I) is connectable, by a shifting element (D), to a carrier (122) of a third planetary gearset (PG3) and a second gearwheel plane (II) is in driving connection with the carrier (124) of the first planetary gearset (PG4).

14. The transmission according to claim 1, wherein a separator clutch (K0) is provided, as a starting clutch, for connecting a drive engine to the drive input shaft (ANW) on an input side of the transmission (1).

15. The transmission according to claim 1, wherein by at least the first, the second, the third, the fourth and a five additional shifting elements (A to F, L, H, R) and at least two powershifting elements (K1, B2), and also the first, the second and four addition planetary gearsets (PG1, PG2, PG3, PG4, PG5, PG6), at least 14 forward gears (V1 to V14) and at least seven reversing gears (R1 to R7) can be implemented by the transmission.

16. A transmission (1) for either a passenger vehicle or a commercial vehicle, the transmission (1) comprising:
- a housing (G),
- a drive input shaft (ANW),
- a drive output shaft (AW),
- at least first and second planetary gearsets (PG1, PG4), the first planetary gearset (PG4) comprising a sun gear (104), at least one planetary gearwheel (114), a planetary carrier (124) and a ring gear (134), as well as a plurality of shifting elements (A to F, H, J, K, L, V, R, X, Y), the second planetary gearset (PG1) comprising at least two planetary gearwheels (111.1, 111.2) and two planetary carriers (121.1, 121.2) connected to one another, in a rotationally fixed manner, on which the respective planetary gearwheels (111.1, 111.2) are mounted to rotate,
- the two carriers (121.1, 121.2) of the second planetary gearset (PG1) being connected in a rotationally fixed manner to the drive input shaft (ANW),
- the carrier (124) of the first planetary gearset (PG4) being connected, in a rotationally fixed manner, to the drive output shaft (AW),
- a sun gear (101) of the second planetary gearset (PG1) being connectable, by at least one first shifting element (K1, B), to the housing (G) and, the sun gear (101) of the second planetary gearset (PG1) being connectable by a second shifting element (A), to the drive input shaft (ANW),
- the ring gear (134) of the first planetary gearset (PG4) being connectable, by a third shifting element (E), to the housing (G) and the ring gear (134) of the first planetary gearset (PG4) being connectable by a fourth shifting element (F), to the carrier (124) of the first planetary gearset (PG4),
- the sun gear (104) of the first planetary gearset (PG4) and a ring gear (131) of the second planetary gearset (PG1) being connected, in a rotationally fixed manner, to one another, and
- all of the shifting elements (A, B, E, F, K1) are arranged in the housing (G) and accessible from an outside of the transmission.

17. A multiple-gear transmission for a motor vehicle, the transmission comprising:
- a housing (G),
- a drive input shaft (ANW),
- a drive output shaft (AW),
- first, second, third and fourth shifting elements,
- at least first and second planetary gearsets (PG1, PG4) in which the first planetary gearset (PG4) comprising a sun gear (104), at least one planetary gear (114), a planetary carrier (124) and a ring gear (134),
- the second planetary gearset(PG1) comprising a sun gear, a ring gear, at least two planetary gearwheels (111.1, 111.2) and two planetary carriers (121.1, 121.2), and the two planetary carriers of the second planetary gearset being connected to one another in a rotationally fixed manner,
- the at least two planetary gearwheels being rotatably supported on the respective two planetary carriers,
- the two planetary carriers (121.1, 121.2) of the second planetary gearset (PG1) being connected to the drive input shaft (ANW) in a rotationally fixed manner,
- the carrier (124) of the first planetary gearset (PG4) being connected, in a rotationally fixed manner, to the drive output shaft (AW),
- the sun gear (101) of the second planetary gearset (PG1) being connectable, via the first shifting element (K1, B), to the housing (G) and, via the second shifting element (A), to the drive input shaft (ANW),
- the ring gear (134) of the first planetary gearset (PG4) being connectable, via the third shifting element (E), to the housing (G) and, via the fourth shifting element (F), to the carrier (124) of the first planetary gearset (PG4),
- the sun gear (104) of the first planetary gearset (PG4) and the ring gear (131) of the second planetary gearset (PG1) being connected to one another in a rotationally fixed manner, and
- all of the first, the second, the third and the fourth shifting elements (A, B, E, F, K1) are arranged on an interior side of the housing (G) and are accessible from an exterior side of the housing.

* * * * *